(12) United States Patent
Nikles et al.

(10) Patent No.: US 12,255,699 B2
(45) Date of Patent: Mar. 18, 2025

(54) COMPACT MI ANTENNA FOR A HEARING INSTRUMENT AND HEARING INSTRUMENT

(71) Applicant: Sivantos Pte. Ltd., Singapore (SG)

(72) Inventors: Peter Nikles, Erlangen (DE); Johannes Kuhn, Fürth (DE)

(73) Assignee: Sivantos Pte. Ltd., Singapore (SG)

( * ) Notice: Subject to any disclaimer, the term of this patent is extended or adjusted under 35 U.S.C. 154(b) by 273 days.

(21) Appl. No.: 18/082,055

(22) Filed: Dec. 15, 2022

(65) Prior Publication Data
US 2023/0124499 A1  Apr. 20, 2023

Related U.S. Application Data

(63) Continuation of application No. PCT/EP2022/052741, filed on Feb. 4, 2022.

(30) Foreign Application Priority Data

Feb. 5, 2021 (DE) .................. 10 2021 201 095.4
Dec. 9, 2021 (DE) .................. 10 2021 214 085.8

(51) Int. Cl.
*H04B 5/26* (2024.01)
*H01F 27/36* (2006.01)
(Continued)

(52) U.S. Cl.
CPC ............ *H04B 5/26* (2024.01); *H01F 27/361* (2020.08); *H01Q 7/00* (2013.01); *H04R 25/554* (2013.01); *H01Q 1/273* (2013.01); *H04R 2225/51* (2013.01)

(58) Field of Classification Search
USPC ........................................................ 343/866
See application file for complete search history.

(56) References Cited

U.S. PATENT DOCUMENTS 10,536,788 B2  1/2020 Nikles et al.
10,777,892 B2  9/2020 Nikles et al.
(Continued)

FOREIGN PATENT DOCUMENTS

DE  102017209813 B3  9/2018
DE  202018104183 U1  10/2019
(Continued)

*Primary Examiner* — Hoang V Nguyen
*Assistant Examiner* — Brandon Sean Woods
(74) *Attorney, Agent, or Firm* — Laurence A. Greenberg; Werner H. Stemer; Ralph E. Locher

(57) ABSTRACT

An antenna, in particular a magneto-inductive antenna, for a hearing instrument as well as a hearing instrument having such an antenna are provided. The antenna has a first antenna surface and a second antenna surface, which are respectively formed from a flexible magnetic foil. The antenna furthermore has a base, which is formed from a magnetic material or contains a magnetic layer, and which connects the two antenna surfaces to one another. The two antenna surfaces are angled off from the base in the same direction. Lastly, the antenna contains an antenna winding which has at least one first monolayer spiral coil and is arranged, in particular applied, externally on the first antenna surface so that an axis of the first spiral coil is oriented perpendicularly with respect to the first antenna surface.

20 Claims, 16 Drawing Sheets

(51) Int. Cl.
*H01Q 1/27* (2006.01)
*H01Q 7/00* (2006.01)
*H04R 25/00* (2006.01)

(56) References Cited

U.S. PATENT DOCUMENTS

| | | | |
|---|---|---|---|
| 10,893,368 B2 | 1/2021 | Nikles et al. | |
| 11,183,762 B2 | 11/2021 | Kuhn et al. | |
| 2005/0244024 A1* | 11/2005 | Fischer | H04R 25/554 381/331 |
| 2007/0132648 A1* | 6/2007 | Abe | G04R 60/12 343/718 |
| 2010/0202639 A1* | 8/2010 | Christensen | H01Q 1/44 381/315 |
| 2014/0023216 A1* | 1/2014 | Solum | H04R 25/554 381/315 |
| 2016/0205461 A1 | 7/2016 | Fernandez-Medina et al. | |

FOREIGN PATENT DOCUMENTS

| | | | |
|---|---|---|---|
| DE | 102018209189 A1 | 12/2019 | |
| DE | 102018214199 B3 | 1/2020 | |
| DE | 102021201095 A1 | 6/2021 | |
| JP | 2020123522 A | 8/2020 | |
| WO | WO-2006053692 A1 * | 5/2006 | ......... E05B 73/0017 |
| WO | 2017153274 A1 | 9/2017 | |

* cited by examiner

COMPACT MI ANTENNA FOR A HEARING INSTRUMENT AND HEARING INSTRUMENT

CROSS-REFERENCE TO RELATED APPLICATION

This application is a continuation, under 35 U.S.C. § 120, of copending International Patent Application PCT/EP2022/052741, filed Feb. 4, 2022, which designated the United States; this application also claims the priority, under 35 U.S.C. § 119, of German Patent Applications DE 10 2021 201 095.4, filed Feb. 5, 2021 and DE 10 2021 214 085.8, filed Dec. 9, 2021; the prior applications are herewith incorporated by reference in their entirety.

FIELD AND BACKGROUND OF THE INVENTION

The invention relates to a magneto-inductive antenna (abbreviation: MI antenna, that is to say an antenna for magneto-inductive near field transmission), for a hearing instrument and to a hearing instrument having such an antenna.

A hearing instrument generally refers to an electronic device which emits a sound signal into the ear of a person wearing the hearing instrument (also referred to as a "user" or "wearer") and thus assists the hearing of this person. In the narrower sense, the term covers in particular hearing devices which are used to help hearing-impaired wearers. Such hearing devices detect ambient sound and deliver it in a processed, in particular frequency-dependently amplified form as airborne and/or body-borne sound to the user, in which case they compensate fully or at least partially for the user's hearing loss. Further hearing instruments process detected ambient sound—in a similar way to conventional hearing devices—but are used to help users with normal hearing in order to spare their hearing in particular situations (for example special sound-attenuating hearing instruments for musicians) or assist it in other ways. Here and in what follows, however, hearing instruments are also intended to mean devices which convert a cabled or wirelessly received audio signal into airborne or body-borne sound and deliver it in this form to the user, for example headsets, earpieces, etc.

Various designs of hearing instruments are known. For instance, so-called "behind-the-ear" (abbreviation: BTE) devices are worn between the cranium and the pinna, the amplified sound signal being introduced by means of a sound tube into the person's auditory canal or being output by means of a sound transducer (also referred to as a "pickup" or "receiver") seated in the auditory canal. A further version of a hearing instrument is an "in-the-ear" (abbreviation: ITE) device, in which the entire hearing device itself is introduced into the ear, in particular the auditory canal. There are furthermore hearing instruments which transmit the sound information in the form of body-borne sound or directly stimulate the auditory nerve.

Magneto-inductive near-field transmission is used in hearing instruments as an alternative to conventional radio transmission techniques (for example Bluetooth) for the wireless transmission of data, in particular audio signals, with external devices. In particular, magneto-inductive near-field transmission is often used for the communication of two hearing instruments of a binaural hearing system. Furthermore, magneto-inductive methods are also used for energy transmission, i.e. for wireless charging of rechargeable batteries in hearing instruments.

To date, the MI antennas necessary for this (i.e. for magneto-inductive data and/or energy transmission) have generally been produced by winding a ferrite core with an antenna winding (also referred to as a coil). The antenna power may in this case be increased by larger ferrite cores, special winding and particular ferrite materials. Because of the restricted installation space, the sensitive (and therefore interference-susceptible) electronics in hearing instruments and the desire for the lowest possible weight, however, narrow limits are placed on the power increase of conventional MI antennas for use in hearing instruments.

International patent disclosure WO 2017/153274 A1, corresponding to U.S. Pat. No. 10,777,892, describes a concept for an alternative design of an MI antenna, in which the cross section of a coil core (base) wound with an antenna winding is widened by flat magnetic foils. In this foil antenna, the antenna surfaces formed by the foils (which are referred to therein as "shields") are oriented approximately orthogonally with respect to the axis of this base. The antenna surfaces are optionally provided with a paramagnetic or diamagnetic layer on the inner sides facing toward one another, by which the internal space formed between the antenna surfaces is magnetically shielded. Electrical or electronic component parts of the hearing device (for example the battery) can therefore be fitted compactly in the internal space between the antenna surfaces.

Refinements of this antenna design are disclosed in published, non-prosecuted German patent application DE 10 2018 209 189 A1, corresponding to U.S. Pat. No. 10,893,368, and German utility model DE 20 2018 104 183 U1. According to DE 10 2018 209 189 A1, the antenna surfaces angled off from the base are partially configured as lateral coil core sections, which flank the base on both sides and respectively carry a further coil. The antenna winding in this case therefore comprises three coils angled off with respect to one another in terms of their axes. According to DE 20 2018 104 183 U1, the magnetic coil forming the antenna winding is integrated into a flexible circuit board. This circuit board is provided with two conductor layers, which receive the magnetic film sandwiched between them. The two conductor layers are respectively divided into a multiplicity of conductor tracks, mutually opposite conductor tracks of the two conductor layers being electrically connected to one another in order to form the antenna winding by means of through-contacts (vias).

European patent application EP 3 614 494 A1, corresponding to U.S. Pat. No. 11,183,762, discloses a further variant of a foil antenna. Here, the antenna surfaces are formed from mutually separated magnetic foil blanks. The base wound with the antenna winding respectively has an opening on its two end sides, into which one of the foil blanks is inserted.

SUMMARY OF THE INVENTION

The object of the invention is to further improve an antenna for a hearing instrument, particularly in terms of production technology. In particular, the antenna should be producible particularly uncomplicatedly and economically.

This object is achieved according to the invention by an antenna having the features of the independent antenna claim. Advantageous embodiments of the invention are presented in the dependent claims and the description below.

The antenna according to the invention is intended and suitable for use in a hearing instrument, particularly a hearing device. The antenna is a magneto-inductive antenna (MI antenna) which is adapted for data and/or energy transmission in the magnetic near field, in particular at frequencies of up to about 300 MHz (megahertz). The antenna has a first antenna surface and a second antenna surface, which are respectively formed from a flexible magnetic foil, in particular a ferrite foil.

The antenna furthermore has a base, which is formed from a magnetic material or comprises at least one magnetic layer. The base is arranged between the two antenna surfaces and connects the two antenna surfaces to one another mechanically and magnetically. The two antenna surfaces are in this case angled off from the base in the same direction, so that the base together with the two antenna surfaces approximately forms the shape of a letter "U". The (crease) lines, along which the two antenna surfaces are angled off from the base, are also referred to below as the "end-side edges" of the base. The two antenna surfaces and the base in this case enclose a volume of space (also referred to as an "internal space") on three sides. The sides of the two antenna surfaces and of the base facing toward this internal space are respectively referred to as "inner" sides. The respectively opposite sides of the two antenna surfaces and of the base to these inner sides are referred to as "outer sides". The terms "internal" and "external" are used correspondingly. The two antenna surfaces are in particular (but not necessarily) angled off from the base perpendicularly, so that the antenna surfaces face one another while being mutually parallel on either side of the internal space. The two antenna surfaces are preferably configured symmetrically with respect to one another.

Lastly, the antenna contains an antenna winding.

To this extent, the antenna according to the invention resembles a foil antenna such as is known per se from the prior art described above. In contrast to the known foil antennas, however, in the antenna according to the invention the antenna winding is not wound around the base. Rather, according to the invention the antenna winding has at least one first monolayer spiral coil. This first spiral coil is arranged externally on the first antenna surface, so that a (coil) axis of the first spiral coil is oriented perpendicularly with respect to the first antenna surface. The spiral coil is in particular applied on the first antenna surface, in particular adhesively bonded (directly or indirectly) to the first antenna surface.

Here and in what follows, a monolayer spiral coil is intended to mean a magnetic coil in the form of a flat (for example round, polygonal or irregularly shaped) spiral, in which the coil wire or conductor winds around inside the same surface in more than one turn with a varying diameter. In particular embodiments of the invention, the antenna winding consists exclusively of the first spiral coil. In order to achieve a higher antenna efficiency with a given size of the antenna, however, in expedient embodiments of the invention the antenna winding comprises at least one further spiral coil.

Thus, in one variant of the invention, in addition to the first spiral coil, a second monolayer spiral coil is provided, which is arranged, in particular applied, externally on the second antenna surface so that an axis of this second spiral coil is oriented perpendicularly with respect to the second antenna surface. In expedient embodiments, the second spiral coil is configured with the same design as the first spiral coil and/or is arranged centered with respect to the latter (i.e. coaxially in respect of the two coil axes).

As an alternative or in addition to the second spiral coil, in a further variant of the invention the antenna contains at least one third monolayer spiral coil, which is arranged, in particular applied, externally and—with respect to the spiral plane—parallel to the first spiral coil on the first antenna surface. In expedient embodiments, the third spiral coil is configured with the same design as the first spiral coil and/or is arranged centered with respect to the latter (that is to say again coaxially in respect of the two coil axes).

In the scope of the invention, the antenna may contain further second or third spiral coils, which flank the second or first antenna surface, respectively. The terms "second" spiral coil and "third" spiral coil are therefore used here merely for unique designation of the respective spiral coil in respect of its arrangement relative to the first spiral coil, but not for numbering of the spiral coils. Correspondingly, in particular embodiments of the invention the antenna may also have only the first spiral coil and one or more third spiral coils, but no second spiral coil.

The optionally provided plurality of monolayer spiral coils may, in the scope of the invention, be permanently interconnected with one another (in particular electrically connected in series) and therefore may together form a multilayer antenna winding. In one particularly advantageous embodiment of the invention, however, the two spiral coils or at least two of optionally a plurality of spiral coils can be driven, i.e. coupled to a corresponding circuit for transmitting or receiving a signal or for supplying or drawing energy, independently of one another. The independent driving of at least two spiral coils on the one hand allows a temporary increase in the transmission power of the antenna by turning off a spiral coil and therefore consequently increasing the current strength of the winding current. On the other hand, the independent driving of at least two spiral coils allows a temporary increase in the antenna efficiency by turning on a spiral coil.

In advantageous embodiments of the invention, the or each spiral coil is produced in RFID technology (i.e. in the manner of the antenna coil of an RFID transponder). The spiral coil is in this case produced in particular by printing, electrolytic deposition, vapor deposition, sputtering, etching conductor tracks or by embedding a coil wire on a carrier foil. The use of RFID technology for producing the or each spiral coil has the advantage that the or each spiral coil may in this way be produced particularly uncomplicatedly and economically.

In one likewise expedient alternative, the or each spiral coil is formed by a conductor track of a flexible circuit board. This has, in particular, the advantage that the spiral coil may be relatively simply produced integrally with associated drive electronics and optionally with the signal processing of the hearing instrument, which is generally present anyway.

In a further alternative embodiment, the or each spiral coil is formed as an air coil in which a plurality of turns of an insulated (in particular lacquer-insulated) winding wire are wound directly on one another. The turns are in this case preferably fixed to one another, in particular baked together, by a lacquer layer (in particular by the lacquer used for the electrical insulation). The lacquer layer in this case, in particular, forms the only means for the mutual fixing of the turns; such an air coil therefore preferably does not have a carrier foil or other flat carrier structure. By the above-described configuration of the or each spiral coil as an air coil, a particularly large winding density may advantageously be achieved with relatively little outlay.

The or each spiral coil is preferably configured so that it encloses a relatively large central free space without winding. The diameter of this free space in this case preferably takes up more than 50% of the outer diameter of the respective spiral coil. By this configuration of the or each spiral coil, a particularly high turn concentration is achieved in the outer region of the respective spiral coil. For a given number of turns—in comparison with a spiral coil which encloses a smaller free space without turns—a particularly large effective area and therefore a particularly high sensitivity (performance) of the antenna are therefore achieved.

In advantageous embodiments of the antenna, the or each spiral coil is configured so that its outer diameter is greater than the outer diameter of the assigned antenna surface. In other words, the or each spiral coil preferably protrudes laterally beyond the respectively assigned antenna surface. By this over-dimensioning of the or each spiral coil in comparison with the respectively assigned antenna surface, a particularly high sensitivity of the antenna is again achieved.

In expedient embodiments of the antenna, the ferrite foil is configured so that a plurality of protuberances (radial extensions) distributed over the circumference of the respective antenna surface project from the outer circumference of at least one of the two antenna surfaces. If—as described above—the or each spiral coil protrudes laterally beyond the edge of the assigned antenna surface, these radial extensions serve for mechanical stabilization of the coil. This is advantageous in particular if the spiral coil is fixed directly on the antenna surface and is not supported by a carrier foil or a reflection foil. In addition or as an alternative, the radial extensions are used for fixing the antenna on a structural component of the hearing instrument, for example a housing or an electronics frame fitted therein.

In principle, the two antenna surfaces may be formed from separate foil pieces. In the scope of a further simplification of production and in order to achieve a particularly high antenna efficiency, however, the two antenna surfaces and the base are preferably formed by a one-piece foil blank of the magnetic foil. As an alternative thereto, the two antenna surfaces and the base are formed by two foil blanks of the magnetic foil which respectively protrude into the region of the base.

In a similar way to the foil antennas known from the prior art, the two antenna surfaces are each preferably widened relative to the base. In particular, the two antenna surfaces in this case each have a circular widening such as is known per se from the antennas disclosed in European patent application EP 3 614 494 A1.

In order to shape the magnetic field of the antenna favorably and therefore to significantly increase the efficiency of the antenna while taking into account a limited installation space and/or maximum weight of the antenna, the antenna preferably has a first magnetic reflection layer consisting of an electrically conductive material having a low magnetic permeability. This first reflection layer consists in particular of copper or aluminum, for example in the form of a foil or coating. The first reflection layer is in this case respectively arranged, in particular applied, externally on the first antenna surface and the second antenna surface, so that the first reflection layer is arranged between the antenna surfaces and the or each spiral coil. The or each spiral coil and the respectively assigned antenna surface therefore receive the first reflection foil sandwiched between them. In the region of each of the two antenna surfaces, the first reflection layer respectively has a recess (i.e. a hole) through which the magnetic flux is introduced into the antenna surfaces and led out from the antenna surfaces while being concentrated. The or each spiral coil is in this case arranged in the region of one of the two recesses, in particular while being centered with respect to the assigned recess. In embodiments of the antenna in which only the first antenna surface is assigned one or more spiral coils, the first reflection layer is optionally omitted from the second antenna surface. In this case, the first reflection layer covers only the first antenna surface and preferably the base.

In an expedient embodiment of the invention, the first reflection layer is dimensioned so that it protrudes beyond the antenna surfaces laterally (i.e. transversely with respect to the axis of the or each spiral coil). In this way, particularly effective field shaping is achieved. Preferably, the first reflection layer furthermore covers not only the two antenna surfaces but additionally the base as well, in order to avoid undesired emergence of stray magnetic fields from the magnetic material of the base as much as possible. In particular, the first reflection layer in this case forms a continuous surface covering the two antenna surfaces and the base.

Preferably, the first reflection layer has on the side respectively facing away from the base, in the region of each antenna surface, a slit which extends from the respective recess as far as the outer edge of the first reflection layer. The first reflection layer is thus not annularly continuous around the recesses because of the slit, so that the occurrence of interfering circular currents in the first reflection layer is counteracted.

In addition or as an alternative to the first reflection layer, the antenna preferably has a second magnetic reflection layer consisting of an electrically conductive material having a low magnetic permeability, in particular copper or aluminum. This second reflection layer is in this case respectively arranged, in particular applied, internally on the first antenna surface and the second antenna surface. The second magnetic reflection layer also preferably extends beyond the base and in this case expediently forms a continuous surface covering the two antenna surfaces and the base.

The antenna according to the invention has in particular the advantage that it has only a very low weight and requires a very small installation space, since it is formed only from very thin foils or layers (namely the magnetic foil, in particular a ferrite foil, the optionally provided first and/or second reflection layer and the at least one layer of turns). Because of the U-shaped structure which is formed by the antenna surfaces and the base connecting them, with a small installation space the antenna nevertheless encloses a relatively large volume. Because of this large volume, the antenna on the one hand has a high performance; in particular, in the excited state the antenna thereby generates a magnetic field profile which corresponds approximately to that of a rod antenna with the same volume. Unlike in the case of such a rod antenna, however, the enclosed volume is for the most part empty and may therefore be used to accommodate at least one other component part of the hearing instrument, in particular a battery. Accommodating the battery or another component having a metallic housing in the internal space enclosed by the antenna in this case has the additional effect that the metal housing guides the magnetic flux inside the magnetic foil of the antenna and therefore additionally promotes the performance of the antenna.

The antenna according to the invention has the further advantage that—also in comparison with conventional foil antennas—because of the flat configuration of the coil(s) in RFID technology, it may be produced very uncomplicatedly and economically on a printed circuit board or as air coil(s); the formation of the coil(s) on a printed circuit board in this case has the additional advantage that the or each coil can be integrated (and preferably are integrated) in a common circuit carrier with the signal-processing and/or control electronics of the hearing instrument, so that the mounting outlay for the hearing instrument is reduced. In particular, in this case the outlay for soldering or other contacting of the antenna winding with the associated transmission and/or reception circuit or the charging electronics of the hearing instrument is obviated.

An additional advantage of the antenna according to the invention is that it is highly flexible and can therefore be adapted to the design constraints in the hearing instrument. In particular, the antenna may be adapted to different body shapes. The turns of the coil(s) need not necessarily be round. Rather, in the scope of the invention they may assume different shapes, in particular angular, oval, organic shapes or combinations of these shapes (for example a contour adapted to the shape of the hearing instrument). In order to obtain an antenna with the best possible performance, the shape of the coil(s) is in this case preferably configured so that the antenna winding fills the maximum available area. Furthermore, the antenna may be simply adapted to the performance and/or inductance desired in the respective application by selecting the number of monolayer spiral coils; in particular, a high performance or inductance of the antenna may be achieved by adding one or more spiral coils even in the case of only a very small usable area.

In an expedient method for mounting the antenna, one of the two antenna surfaces is initially applied with an end side on a surface of a component to be received in the internal space of the antenna (in particular on an end surface of the battery) and optionally fixed, in particular by adhesive bonding. The base and the other antenna surface are then folded around the component. Finally, the other antenna surface is applied on an opposite surface of the component (in particular on the other end surface of the battery) and optionally fixed. This mounting method, which is simple to implement per se, may however lead to complications insofar as precise centering of the antenna surfaces with respect to one another and with respect to the component is thereby relatively difficult to achieve. This is due on the one hand to manufacturing tolerances of the magnetic foil and the other component parts. On the other hand, according to experience the magnetic layer (in particular ferrite layer) of the magnetic foil is susceptible to breaking irregularly and irreproducibly when the foil blank is being folded around the component. The manufacturing differences of the antenna are therefore increased further by the mounting process described above, and above all the degrees of freedom in the positioning of the second antenna surface on the component are restricted by the preceding process steps.

In order to allow simple, but at the same time precise and reproducible mounting of the antenna, in a refinement of the invention a plurality of measures described in more detail below are proposed, which may be used independently of one another or in any desired combination with one another.

According to a first of the measures, in addition the antenna preferably comprises a guide body which bears with a guide surface on a surface of the base facing toward the internal space. The guide body, which is preferably formed by an injection-molded part made of plastic, thus lies in particular between the base and the component (in particular the battery) received in the internal space of the antenna in the mounted state of the antenna. The guide body assists centering of the antenna with respect to the component (and therefore also centering of the antenna surfaces with respect to one another) since it facilitates a mounting process which starts from the base (and is therefore symmetrical). Preferably, the base is in this case initially connected to the guide body. The guide body is then placed on the component to be received in the internal space of the antenna. The two antenna surfaces are then bent around the component on both sides and optionally fixed thereto. The precision of this mounting process is increased in an expedient embodiment by an inner side of the guide body being provided with a contour complementary to the component, so that the guide body can be placed on the component with an accurate (in particular self-centering) fit.

In order to increase the reproducibility of the folding process in which the two antenna surfaces are angled off from the base, and particularly in order to avoid or keep low irregular and irreproducible breaks of the magnetizable layer of the magnetic foil, the guide body is preferably provided on its guide surface, in the region of the end-side edges of the base, respectively with a (cylindrically) convex guide radius by means of which the magnetic foil is guided when angling the antenna surfaces off from the base.

In addition or as an alternative, in an expedient configuration, the guide body has at least one (for example pin-shaped) centering protrusion projecting from the guide surface, which engages in a corresponding incision or a corresponding hole of the base in order to position (center) the base. In another expedient configuration, the guide body is provided on both sides of the guide surface with rail extensions or protrusions, between which the base comes to lie. By this configuration, the base (and therefore indirectly also the antenna surfaces) are held in the guide surface with a form fit.

Optionally, the guide body is provided with further functional structures, for example structures to fix a circuit board and/or structures to guide winding wires.

According to a second measure, the or each foil blank is preferably provided in the region between one of the two antenna surfaces and the base with an intended flexion position by the magnetic foil being locally weakened at this position by at least one indentation. In different variants, either a multiplicity of point-like indentations or one or more linear indentations or a combination of point-like and linear indentations are introduced into the magnetic foil. The indentations are produced, in particular, by material removal by means of laser radiation (laser cutting). The or each indentation may be introduced into the magnetic foil with a different depth, but preferably so that it does not penetrate fully through the foil. The or each indentation is furthermore preferably introduced into the inner side of the magnetic foil facing toward the internal space. In the angled-off state of the magnetic foil, the indentations therefore lie on the concave side of the crease positions and are therefore fully or at least partially recompressed by the material of the foil during the flexing of the magnetic foil. Irregular breaks of the magnetizable layer are avoided by the intended flexion positions, so that the manufacturing tolerance in the mounting of the antenna is in turn reduced.

A third measure for achieving simple, but at the same time precise and reproducible mounting of the antenna is applied in embodiments of the antenna in which the antenna surfaces and the base are composed of two foil blanks of the magnetic foil. Each of the two foil blanks in this case respectively has one of the two antenna surfaces and at least one lug protruding (in particular radially) from the edge of the respective antenna surface. In order to form the base, in this case the or respectively one of optionally a plurality of lugs of one of the two foil blanks is placed overlapping onto a (respectively) corresponding lug of the other foil blank.

The formation of the antenna surfaces and of the base from two foil blanks allows independent (and therefore particularly precise) fixing of the two antenna surfaces on the component to be received in the internal space of the antenna. In addition, manufacturing tolerances (as well as different thicknesses of the component) may be compensated for by the different degree of overlap of the lugs, without this having a significant effect on the magnetic properties of the antenna. Furthermore, the two foil blanks are preferably manufactured identically, so that the manufacturing process is simplified.

If the two foil blanks are respectively provided with a plurality of lugs, the antenna base formed from these lugs is divided into a plurality of independent portions. The order in which the lugs of the two foil blanks are in this case placed on one another is then preferably alternated. The multi-portion configuration of the base makes it possible to produce a base having a relatively large cross section (and therefore good magnetic coupling between the two antenna surfaces), without the base protruding greatly beyond the component received in the internal space in the radial direction. In other words, the division of the base into a plurality of portions—respectively formed from corresponding lugs of two foil blanks—allows the base to be laid in a simple way around the circumference of the component received in the internal space so that, with a particularly compact shape of the antenna, good magnetic coupling is nevertheless achieved between the two antenna surfaces. Furthermore, as is recognized, a plurality of narrow lugs can be angled off from the antenna surface more easily, and with a lower risk of irregular breaks of the magnetizable layer, than a wider lug having the same overall cross section. The plurality of portions of the base are preferably arranged with respect to one another so that—as seen looking at one of the antenna surfaces—they are oriented at an angle between 40° and 180°, preferably 45°, 90° or 120°, with respect to one another. It has been found that by the base portions lying far away from one another in this way—in comparison with a base consisting of a single portion or two closely adjacent portions—particularly effective magnetic coupling is achieved between the two antenna surfaces.

Preferably, the magnetic foil of the two foil blanks is formed from a magnetizable layer, in particular a ferrite layer or ferrite powder layer, which is enclosed on both sides (sandwiched) by a plastic layer (in particular consisting of polyethylene terephthalate, abbreviation: PET). In this case, in an expedient embodiment of the invention, one of the plastic layers is removed in the or each overlap region of the corresponding lugs, so that the corresponding lugs respectively bear on one another directly with the magnetizable layer. In this way, the magnetic coupling between the antenna surfaces is improved further.

One particular implementation of the invention is a hearing instrument which is equipped with the antenna according to the invention as described above, particularly in one of the embodiments described above. The hearing instrument has in particular, in a manner customary per se—inside or outside a housing—an output transducer, for example a pickup for output of a sound signal into the ear of a user. The hearing instrument furthermore preferably has a (programmed, nonprogrammable or partially programmable) signal processor for processing, in particular amplification, of the sound signal to be output to the user. The hearing instrument furthermore preferably has an input transducer, in particular at least one microphone, for acquiring ambient sound, this acquired ambient sound being output through the output transducer after processing, in particular amplification.

In expedient embodiments, the hearing instrument has a functional component, for example a (rechargeable or non-rechargeable) battery or a pickup, this functional component having a housing consisting of an electrically conductive material having a low magnetic permeability, in particular copper, aluminum or a steel sheet. The antenna is in this case placed onto the functional component so that the housing tightly internally flanks the antenna surfaces (and preferably also the base). The housing of the functional component thereby fulfills the function of the above-described second reflection layer, which is consequently superfluous in this embodiment and is therefore preferably not present. Preferably, the housing bears directly on the respective inner side of the antenna surfaces and optionally also on the inner side of the base.

In the scope of the invention, the antenna according to the invention may in principle be used advantageously in any hearing instruments of the type mentioned in the introduction, including particularly in a headset, earpiece, etc. The hearing instrument according to the invention is preferably a hearing device, which may optionally be for example in the form of a BTE or ITE device.

Other features which are considered as characteristic for the invention are set forth in the appended claims.

Although the invention is illustrated and described herein as embodied in a compact MI antenna for a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts which correspond to one another are always provided with the same references in all the figures.

Figure 1:
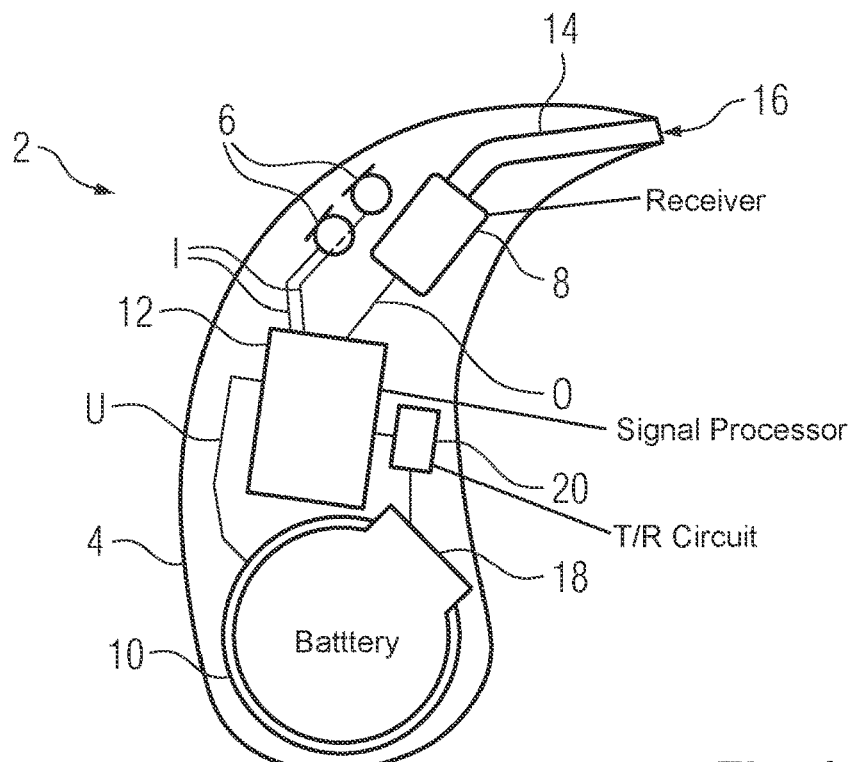
FIG. 1 is a schematic view of a hearing instrument, here in the form of a behind-the-ear hearing device, having a battery and an antenna placed thereon.

Referring now to the figures of the drawings in detail and first, particularly to FIG. 1 thereof, there is shown a hearing instrument, which in this case is a hearing device 2 to assist the hearing of a hearing-impaired user. The hearing device 2 in the example represented here is a BTE device wearable behind a user's ear.

Inside a housing 4, the hearing device 2 contains two microphones 6 as input transducers as well as a pickup 8 (receiver) as an output transducer. The hearing device 2 furthermore contains a battery 10 and signal processing in the form of a signal processor 12. Preferably, the signal processor 12 contains both a programmable subunit (for example a microprocessor) and a nonprogrammable subunit (for example an ASIC).

The signal processor 12 is supplied from the battery 10 with an electrical supply voltage U.

During normal operation of the hearing device 2, the microphones 6 respectively detect airborne sound from the environment of the hearing device 2. The microphones 6 respectively convert the sound into an (input) audio signal I, which contains information relating to the detected sound. The input audio signals I are delivered inside the hearing device 2 to the signal processor 12, which modifies these input audio signals I in order to assist the user's hearing.

The signal processor 12 outputs an output audio signal O, which contains information relating to the processed and therefore modified sound, to the pickup 8.

The pickup 8 converts the output sound signal O into modified airborne sound. This modified airborne sound is transmitted into the user's auditory canal via a sound channel 14, which connects the pickup 8 to a tip 16 of the housing 4, and via a flexible sound tube (not explicitly shown) which connects the tip 16 to an earpiece fitted into the user's auditory canal.

In order to be able to exchange data with peripheral devices, for example a second hearing device for supplying the user's second ear, the hearing device 2 furthermore contains an antenna 18. The antenna 18 is an MI antenna, which uses magneto-inductive near-field transmission for the data exchange. In order to drive the antenna 18, the hearing device 2 contains a transmission/reception circuit 20 connected thereto, which is connected on the one hand to the antenna 18 and on the other hand to the signal processor 12 of the hearing device 2. In addition or as an alternative, the antenna 18 is used for the wireless reception of energy in order to charge the battery 10. The antenna 18 is in this case (optionally also) connected to an electronic charging control of the hearing device 2, which controls the charging process of the battery 10.

Figure 2:
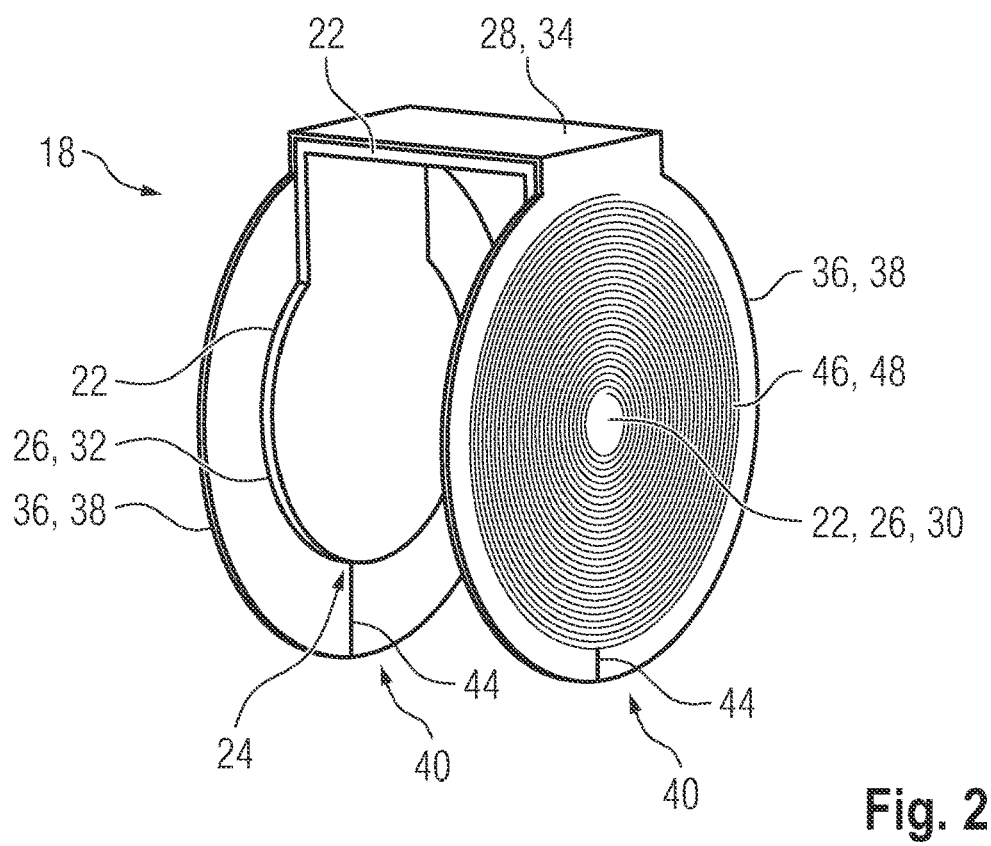
FIG. 2 is a perspective view of the antenna of the hearing device of FIG. 1, the antenna containing a ferrite foil, a first reflection foil applied externally onto the ferrite foil and an antenna winding in turn applied externally onto the first reflection foil, the antenna winding being formed from a monolayer spiral coil.
Figure 4:
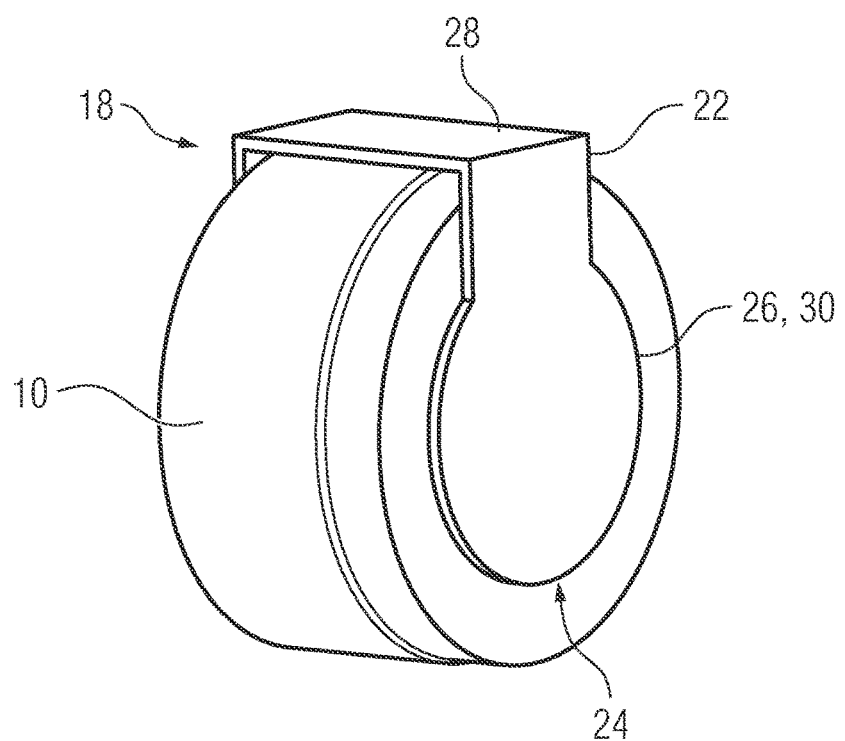
FIG. 4 is a perspective view of the battery and the ferrite foil of the antenna in a representation corresponding to FIG. 3.
Figure 6:
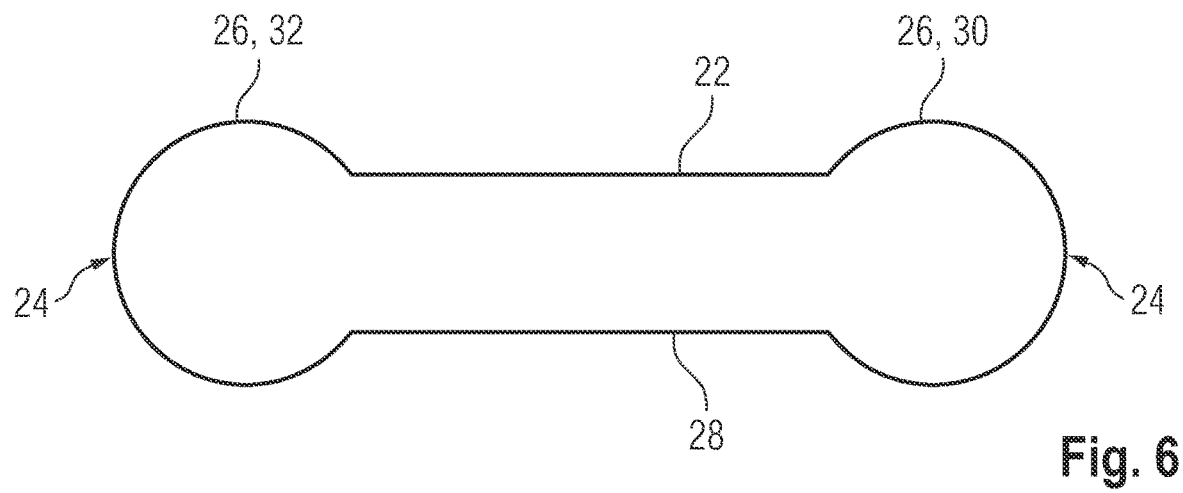
FIG. 6 is a top view of the ferrite foil of the antenna in the unfolded state.

According to FIG. 2, instead of a solid magnet core, the antenna 18 contains a flexible magnetic foil in the form of a ferrite foil 22, which has a thickness of approximately 30 to 400 µm (micrometers), preferably from 50 to 300 µm, and in particular 100 µm. As may also be seen in particular from FIGS. 2, 4 and 6, the ferrite foil 22 is formed by a (preferably one-piece) dumbbell-shaped blank. In the exemplary embodiment represented here, the ferrite foil 22 therefore respectively has a circular widening 26 at its mutually opposite longitudinal ends 24, the two widenings 26 being connected by a narrower connecting section 28. In order to form the antenna 18, the ferrite foil 22 is folded to form a U-shaped contour, the limbs of which are respectively formed by one of the two widenings 26 and an adjacent piece of the connecting section 28. The limbs of the U-shaped contour, that is to say the two widenings 26 and the respectively adjacent pieces of the connecting section 28, therefore form two antenna surfaces 30 and 32 which are parallel and face one another at a distance. That part of the connecting section 28 which connects these two antenna surfaces 30 and 32 is referred to as the base 34.

Figure 5:
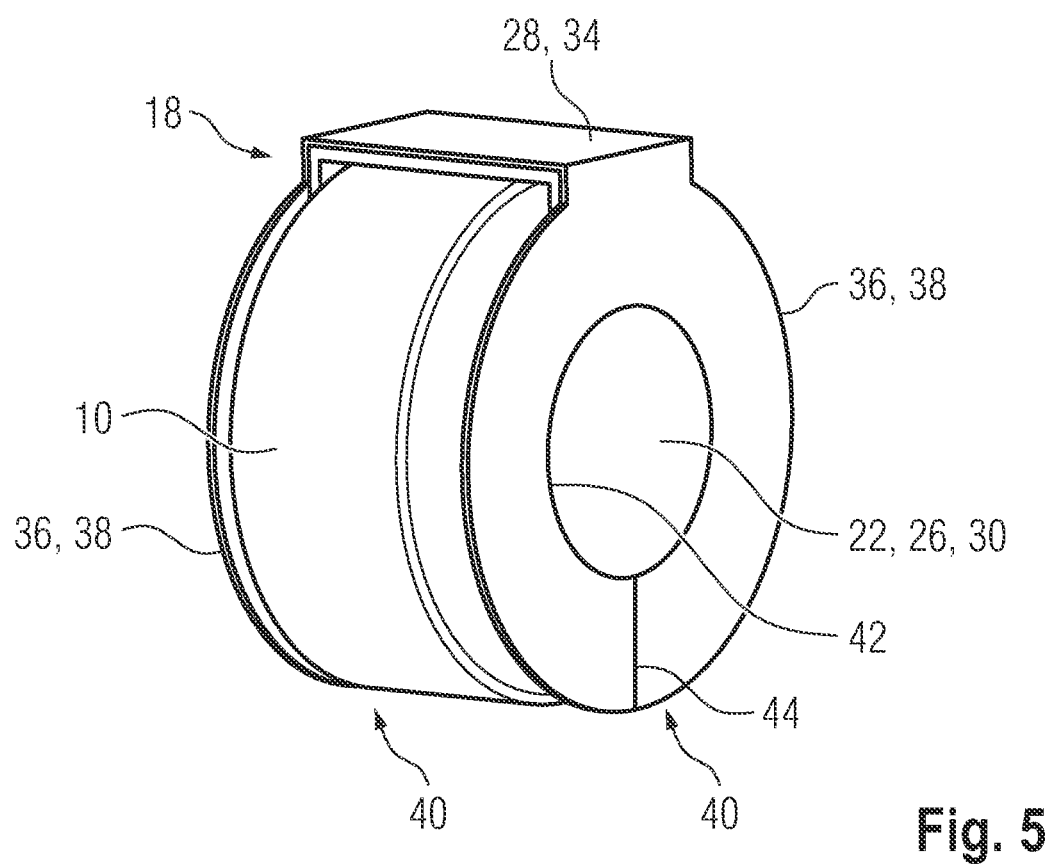
FIG. 5 is a perspective view of the battery as well as the ferrite foil and the first reflection foil of the antenna in a representation corresponding to FIG. 3.

As may be seen from FIGS. 2 and 5, a reflection foil 36 formed of copper is externally applied as a first reflection layer onto the ferrite foil 22, and is preferably adhesively bonded to the ferrite foil 22. The reflection foil 36 has a shape adapted to the ferrite foil 22, that is to say in the case of the present example likewise a dumbbell shape. However, it is provided with larger widenings 38 at its longitudinal ends 40 in comparison with the ferrite foil 22, so that the reflection foil 36 extends laterally beyond the edge of the ferrite foil 22 in the region of the antenna surfaces 30 and 32. Furthermore, the reflection foil 36 is respectively provided with a central circular recess 42 in the region of its widenings 38, so that the widenings 38 respectively have the shape of an annulus. On its sides facing away from the base 34 (that is to say at the longitudinal ends 40 of the reflection foil 36), the circular widenings 38 are respectively interrupted by a thin slit 44, which extends from the respective recess 42 as far as the outer edge of the reflection foil 36.

Lastly, the antenna 18 contains an antenna winding 46. In the exemplary embodiment represented in FIGS. 2 to 6 and 8, this antenna winding 46 is formed by a monolayer spiral coil 48, which is in turn applied externally onto the reflection foil 36. The spiral coil 48 is in this case arranged centered with respect to the widening 26 of the ferrite foil 22 and the widening 38 of the reflection foil (and therefore also centered with respect to the recess 42 introduced into the latter). Unlike in the conventional foil antennas described in the introduction, the antenna winding 46 is therefore not wound around the ferrite foil 22 or another magnet core. The spiral coil 48 is instead arranged with respect to the ferrite foil 22 so that the coil axis 49 (FIGS. 3 and 7) of the spiral coil 48 is perpendicular to the surface extent of the ferrite foil 22 and therefore perpendicular to the antenna surface 30.

In a preferred embodiment, the spiral coil 48 is formed in the manner of the antenna coil of an RFID transponder. For this purpose, it is in particular formed by an electrical conductor track printed onto a carrier foil 50 or embedded in the carrier foil 50 (see in particular FIG. 8), this carrier foil 50 preferably being adhesively bonded on the reflection foil 36. The carrier foil 50 provided with the spiral coil 48 is also referred to in brief as the winding foil 52.

As may be seen in particular from FIGS. 3 to 5 and 8, the antenna 18 in the mounting state is placed onto the (cylindrical) battery 10 so that the antenna surfaces 30 and 32 tightly flank the two end sides of the battery 10 or even bear on the end sides of the battery 10.

Figure 3:
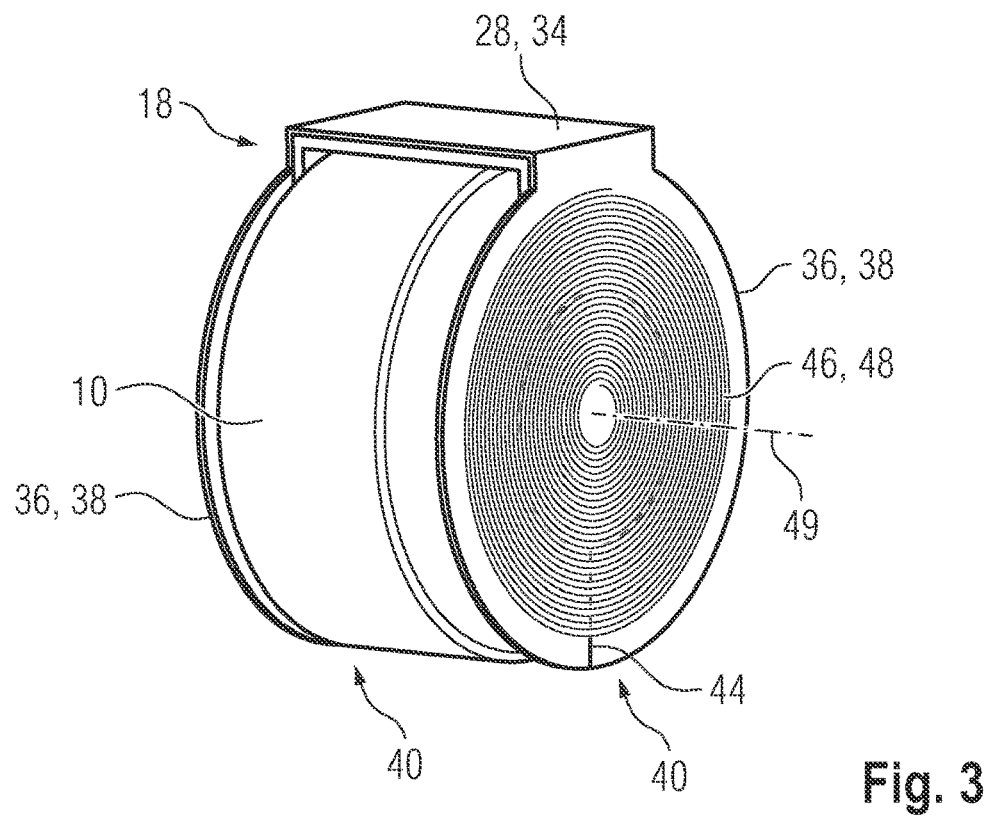
FIG. 3 is a perspective view of the antenna in a state placed onto the battery of the hearing instrument in a representation corresponding to FIG. 2.

As is apparent from FIGS. 3 and 5, the reflection foil 36 is in this case dimensioned so that the widenings 38 correspond approximately in terms of their shape and size to the end sides of the battery 10. The spiral coil 48 is in turn dimensioned so that the area covered by the associated widening 38 of the reflection foil 36 is substantially utilized.

During operation of the antenna 18, the magnetic field generated by the antenna winding 46 is shaped by the pierced reflection foil 36 so that the magnetic field of the antenna 18 corresponds approximately to the magnetic field of a rod antenna having a length equal to the distance between the antenna surfaces 30 and 32. By the reflection foil 36 and a metal housing 54 of the battery 10, the magnetic field in the inner region between the antenna surfaces 30 and 32 is in this case forced to extend substantially inside the ferrite foil 22. The metal housing 54 of the battery 10 to this extent acts as an interior magnetic reflection layer, which on the one hand magnetically shields the internal space enclosed by the antenna 18 and on the other hand increases the performance of the antenna 18.

In order to increase the performance of the antenna 18 further with a given installation space (and a size restricted thereby), in further embodiments of the antenna 18 one or more further spiral coils are added to the antenna winding 46.

Figure 7:
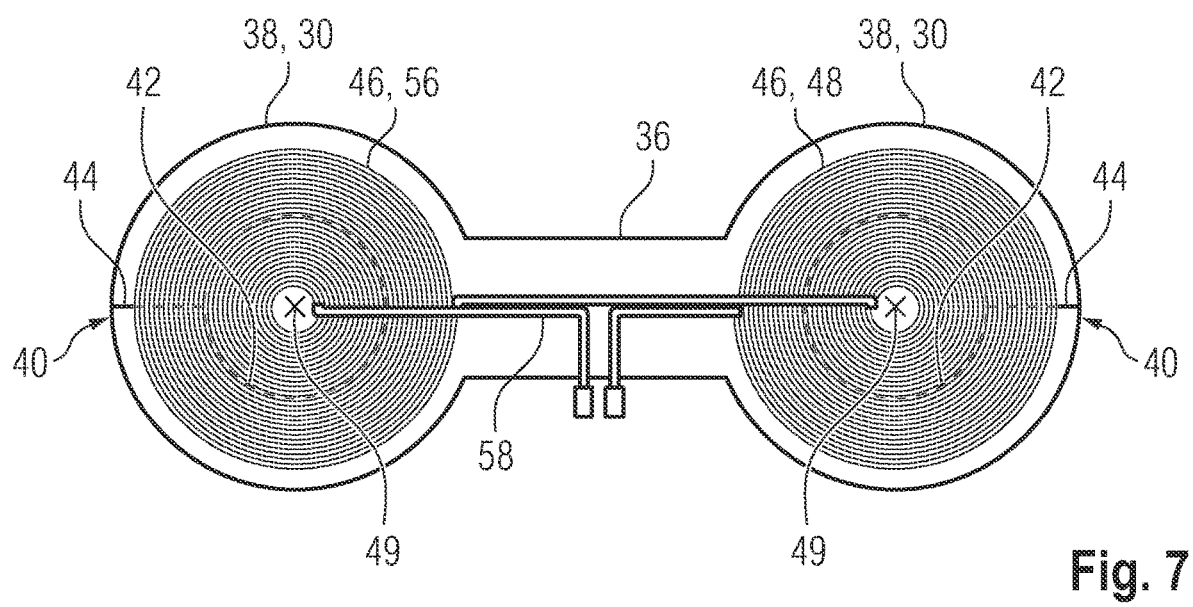
FIG. 7 is a to view of the first reflection foil of the antenna in an alternative embodiment, in which two respectively monolayer spiral foils of the antenna winding are applied on the first reflection foil, the two spiral foils being applied at mutually opposite longitudinal ends of the first reflection foil.
Figure 8:
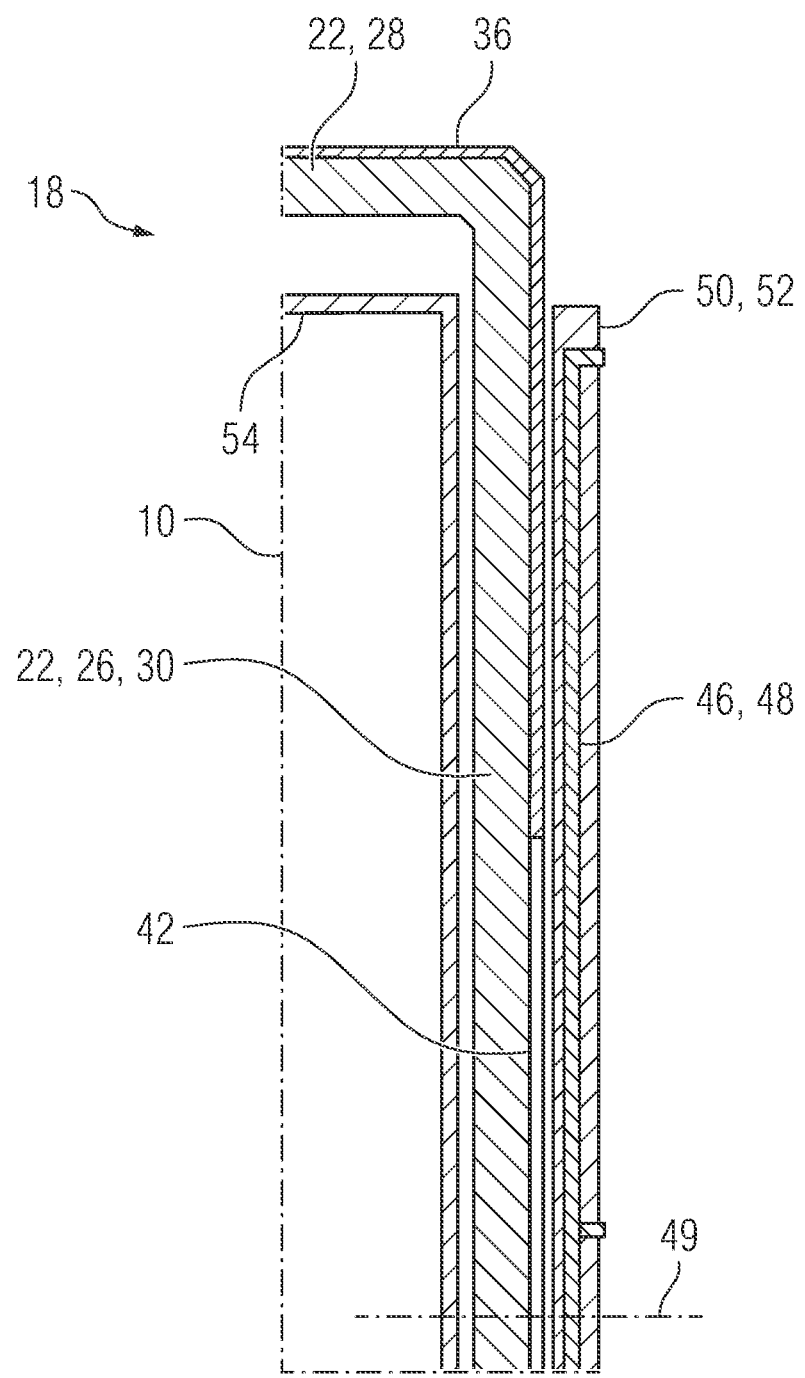
FIG. 8 is a cross-sectional view of a detail of the battery and the antenna according to FIG. 2 placed thereon.

Thus, with the aid of FIG. 7, which represents the reflection foil 36 with the antenna winding 46 applied thereon in the unfolded state, an embodiment of the antenna 18 is shown in which the antenna winding 46 contains a further monolayer spiral coil 56 in addition to the spiral coil 48. This further spiral coil 56 is in this case applied on the other antenna surface 32. The antenna 18 is configured symmetrically in this embodiment in respect of the shape of the ferrite layer 22 and of the reflection layer 36 as well as in respect of the structure (particularly in respect of the arrangement of the two spiral coils 48 and 56), so that the two spiral coils 48 and 56 in the (folded) mounting state of the antenna 18 are arranged coaxially with one another in respect of their coil axes 49. The coil axis 49 of the spiral coil 56 is in this case likewise oriented perpendicularly to the surface extent of the ferrite foil 22 (and therefore perpendicularly to the antenna surface 32).

In the embodiment according to FIG. 7, the two spiral coils 48 and 56 are connected to a common electrical supply lead 58 and are in this case electrically connected in series. In an alternative embodiment, on the other hand, the two coils 48 and 56 are connected separately from one another to the transmission/reception circuit 20 and can be turned on and off individually, or otherwise driven independently of one another, as required during operation of the antenna 18. In one embodiment of the antenna 18, only the spiral coil 48 is connected to the transmission/reception circuit 20, while the spiral coil 56 as a charging coil is connected to the charging control provided here of the hearing device 2.

Figure 9:
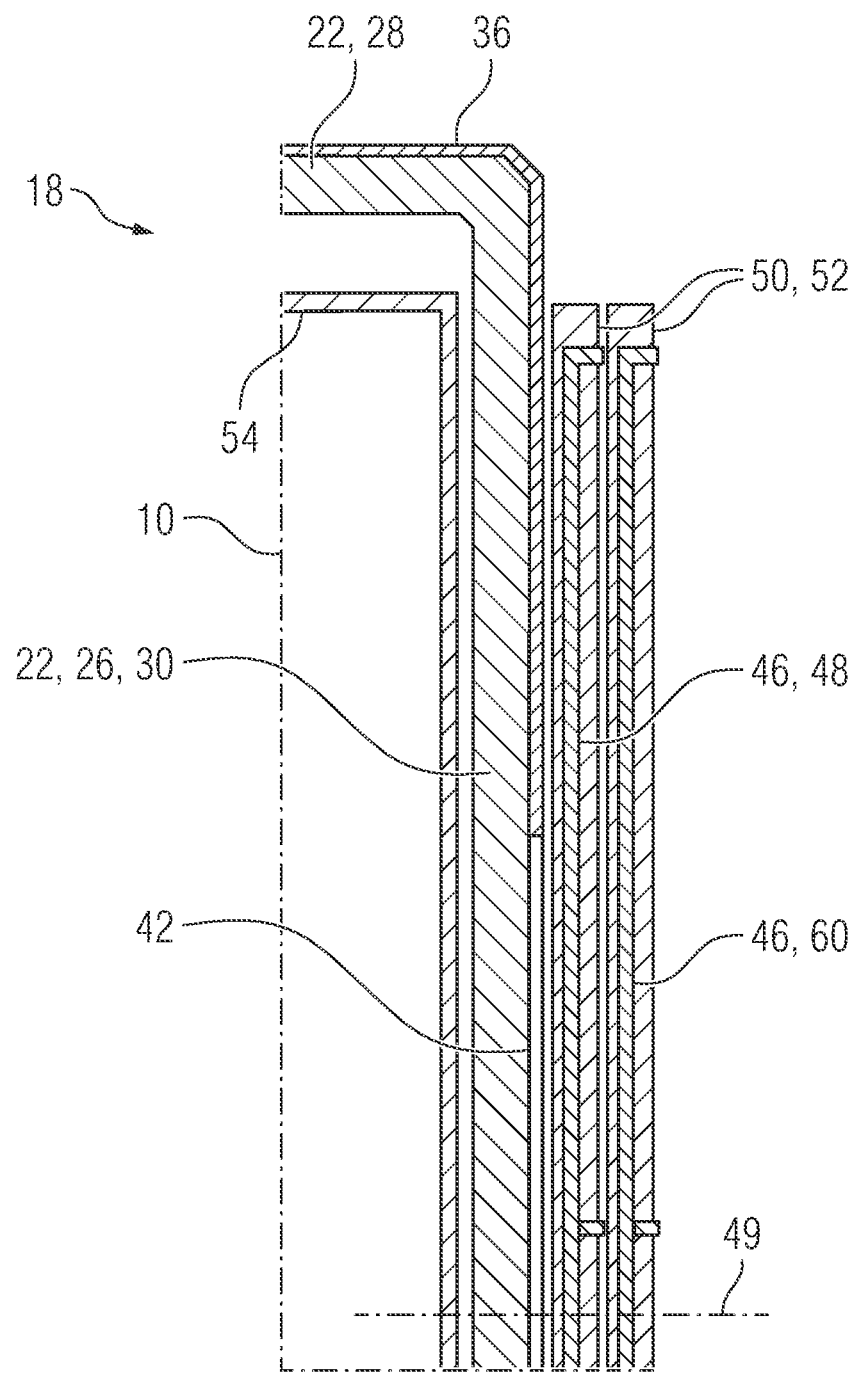
FIG. 9 is a cross-sectional view to FIG. 8 of an alternative embodiment of the antenna, in which the antenna winding contains two respectively monolayer spiral coils applied on one another.

In a further embodiment of the antenna 18, in addition to the spiral coil 48, the antenna winding 46 likewise contains a further monolayer spiral coil 60, although according to FIG. 9 this further spiral coil 60 is applied on the antenna surface 30 together with the spiral coil 48. The spiral coil 60 is in this case preferably applied directly on the spiral coil 48, in particular adhesively bonded thereon. The two spiral coils 48 and 60 are in this case preferably arranged with respect to one another so that they are arranged coaxially with one another in respect of their coil axes 49.

In the embodiment according to FIG. 9, the two spiral coils 48 and 60 are also preferably electrically connected in series and therefore driven together. The two monolayer spiral coils 48 and 60 therefore together form a multilayer coil. As an alternative to this, the two coils 48 and 60 may in the scope of the invention again be driven separately from one another.

In order to increase the performance of the antenna 18 even further, the two spiral coils 48 and 56 or 48 and 60 are, if required, supplemented with further spiral coils, which may optionally be arranged on the antenna surface 30 and/or on the antenna surface 32.

The spiral coils 48 and 56 or 48 and 60, and optionally further spiral coils, are preferably produced with the same design and are therefore in particular respectively in the form of an economically producible and easily handleable winding foil 52. However, the antenna winding 46 may also comprise coils which are configured differently (particularly in respect of the number of turns and the diameter).

Figure 10:
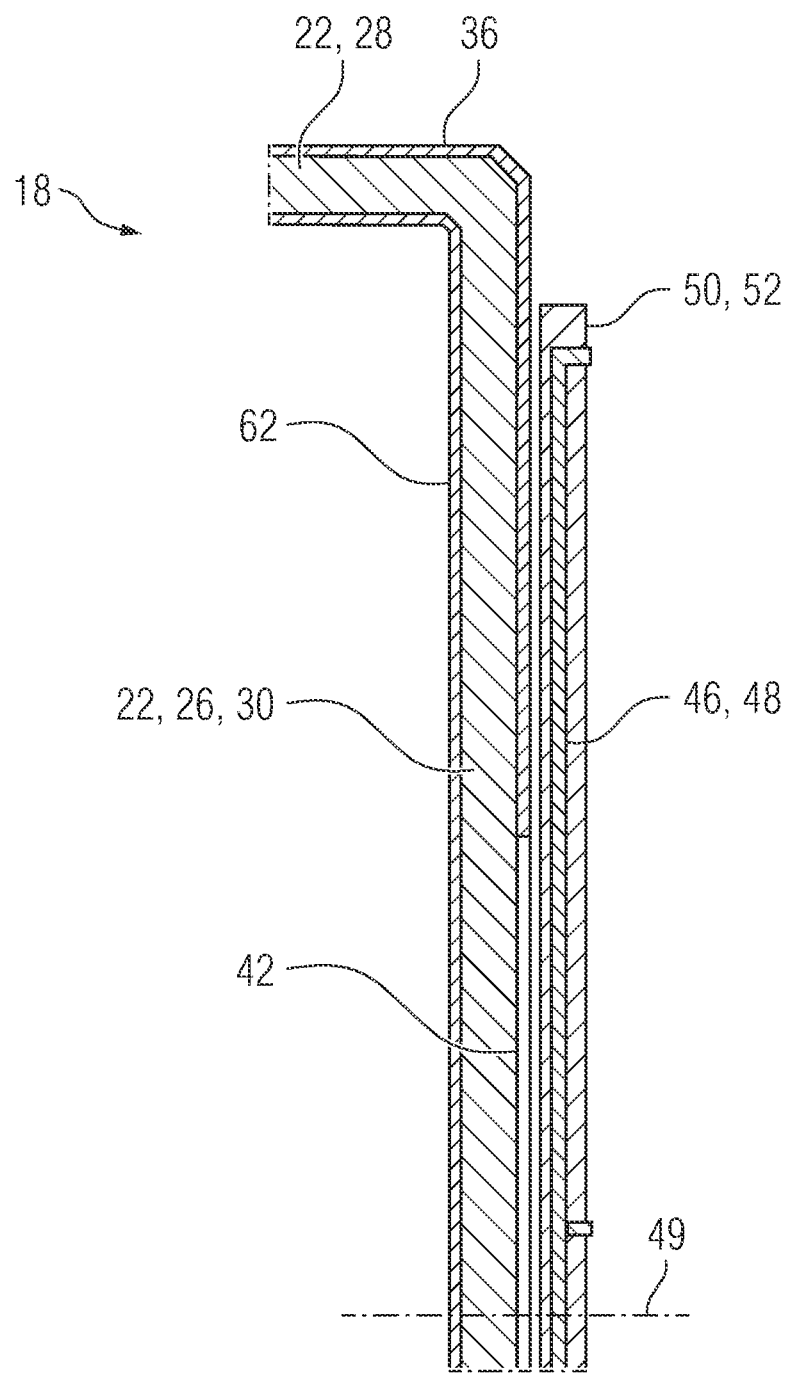
FIG. 10 is a cross-sectional view of a representation corresponding to FIG. 8 of a further embodiment of the antenna with a second reflection foil applied internally on the ferrite foil.

In a further embodiment, the antenna 18 according to FIG. 10 contains a further reflection foil 62, which is applied internally onto the ferrite foil 22, as a second reflection layer. This further reflection foil 62 preferably has a shape corresponding to the reflection foil 36 (but without the recesses 42 and the slits 44) and is arranged covering the reflection foil 36 so that the reflection foils 36 and 62 sandwich the ferrite foil 22 between them. The reflection foil 62 is preferably formed in a similar way to the reflection foil 36 by a metal foil consisting of copper or aluminum, and is preferably adhesively bonded to the ferrite foil 22 and the reflection foil 36. The inner reflection foil 62 improves the magnetic shielding of the internal space enclosed by the antenna 18 and the guidance of the magnetic flux in the interior of the ferrite foil 22. It is provided in particular when, in the installation situation of the antenna 18, unlike in FIGS. 1 to 5, magnetically interference-susceptible component parts which are themselves not sufficiently magnetically shielded are arranged in this internal space.

The reflection foil 62 may also be provided in order to prevent heating of metallic bodies in the internal space of the antenna 18 (for example of the metal housing 54 of the battery 10) as a result of eddy currents.

Figure 11:
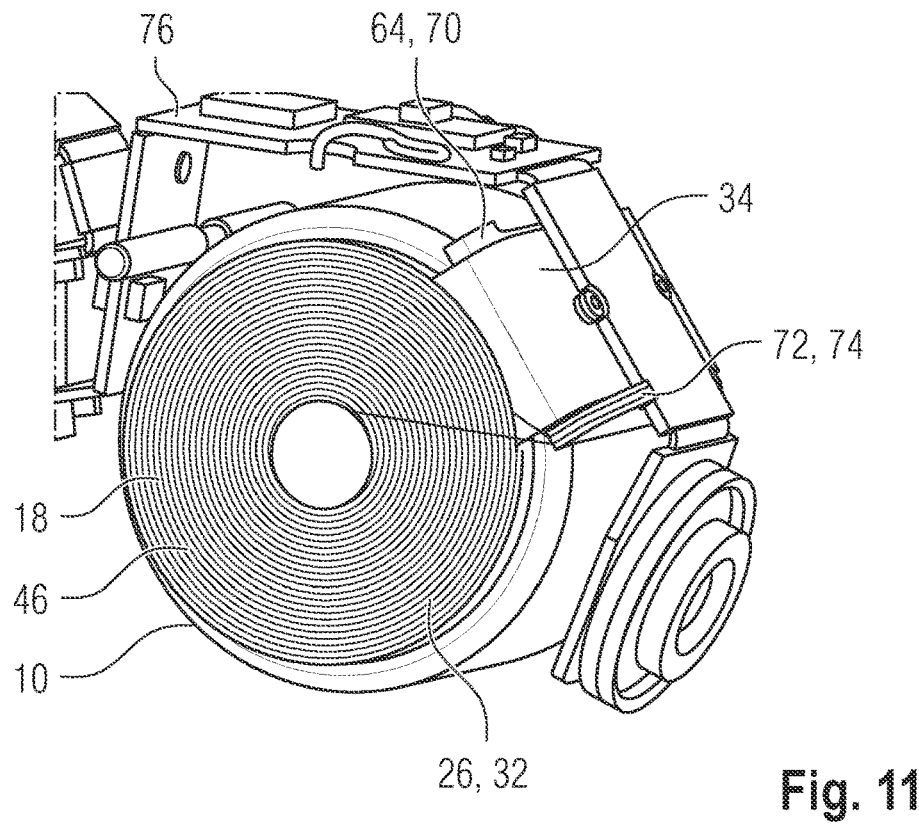
FIGS. 11 and 12 are different perspective views of a further embodiment of the antenna with a guide body for guiding and centering the ferrite foil with respect to the battery.
Figure 12:
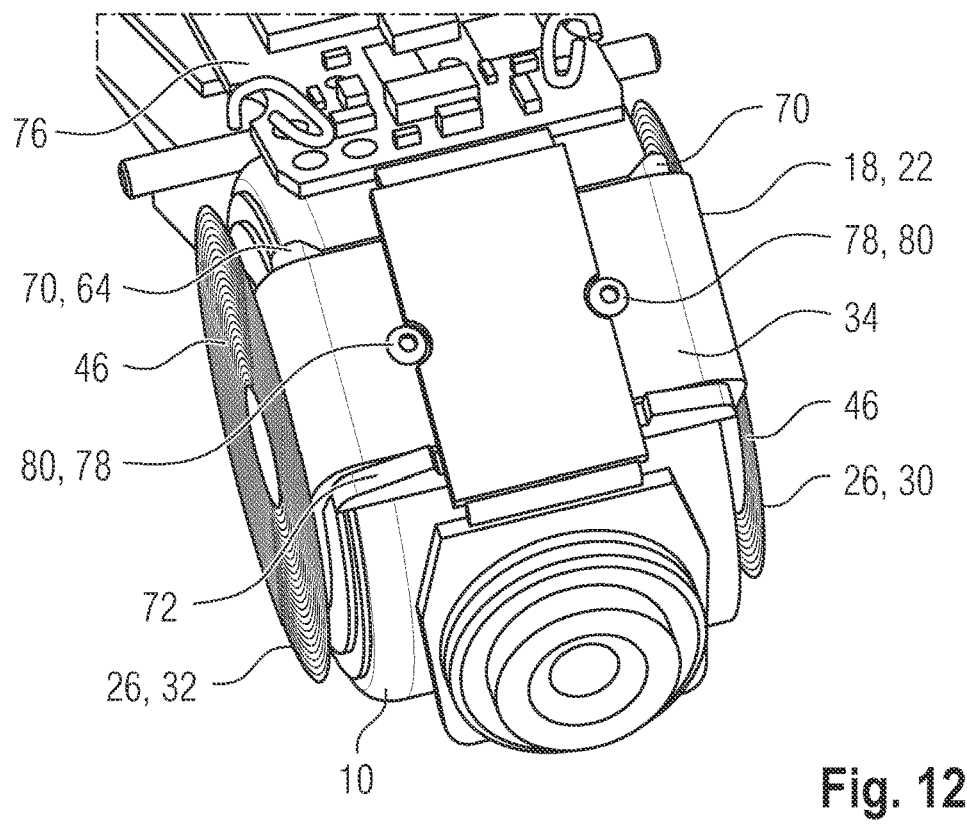
Figure 13:
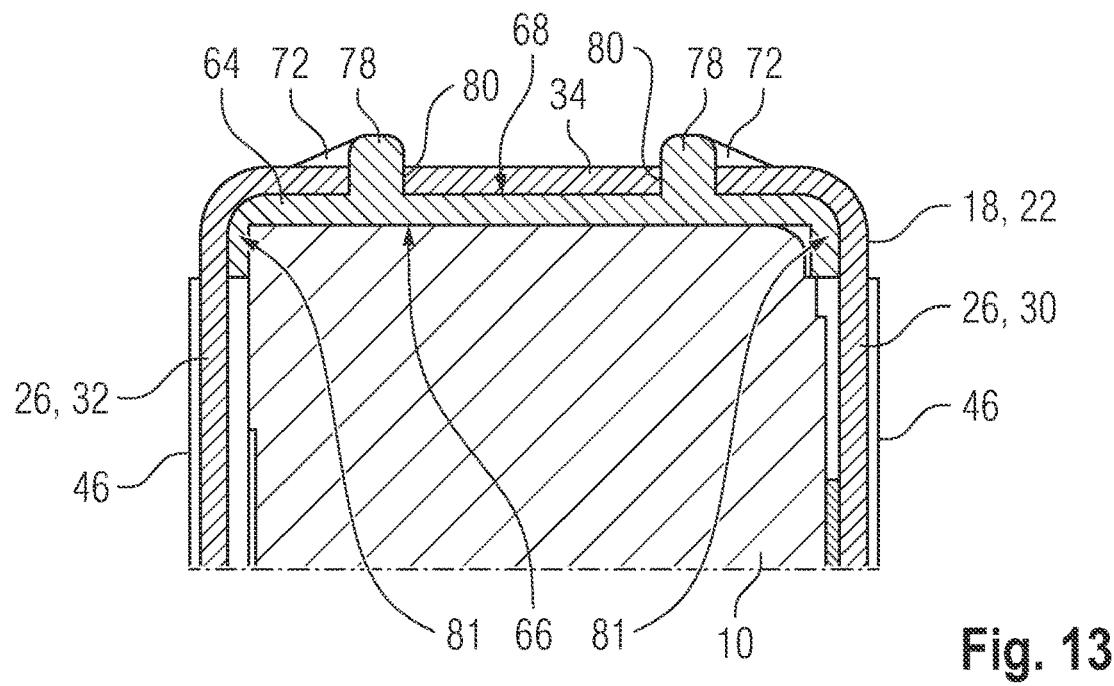
FIG. 13 is a cross-sectional view of the antenna according to FIG. 11 placed onto the battery.

A further exemplary embodiment of the antenna 18 is represented in FIGS. 11 to 13. In this exemplary embodiment, the antenna 18 additionally contains a guide body 64 formed by a plastic injection-molded part. The guide body 64 is arranged between the base 34 and the battery 10 in the mounted state of the antenna 18. On its inner side 66 facing toward the battery 10, the guide body 64 is provided with a shape which is formed at least approximately complementarily with the circumferential contour of the battery 10. With this inner side 66, the guide body 64 is placed with an accurate fit onto the circumference of the battery 10. Opposite to the inner side 66, the guide body 64 has a guide surface 68 with which the guide body 64 bears on the base 34. The guide surface 68 is flanked on both sides by protrusions 70 and 72, which hold the base 34 between them with a form fit and therefore center it. The protrusions 72 are furthermore provided with contours which guide electrical supply leads 74 of the antenna winding 46 to a circuit board 76. For additional fixing and centering of the base 34 (and therefore of the two antenna surfaces 30 and 32), the guide body 64 is provided with two guide pins 78 projecting from the guide surface 68, which pass through corresponding holes 80 of the base.

For mounting of the antenna 18, the base 34 is initially connected to the guide body 64 (for example by adhesive bonding). The guide body 64 is then placed onto the circumference of the battery 10. Subsequently, the two antenna surfaces 30 and 32 are bent down on both sides around the battery 10 and optionally fixed thereto (for example again by adhesive bonding).

In order to increase the reproducibility of the folding process in which the two antenna surfaces 30 and 32 are angled off from the base 34, and particularly in order to avoid or at least keep low irregular and irreproducible breaks of the ferrite layer 86 (FIG. 18) of the ferrite foil 22, the guide body 64 is provided in those regions of the guide surface 68 at which the base 34 merges into the angled-off antenna surfaces 30 and 32 (i.e. respectively in the region of the end-side edges of the base 34) with a (cylindrically) convex guide radius 81 by means of which the ferrite foil 22 is guided.

Figure 14:
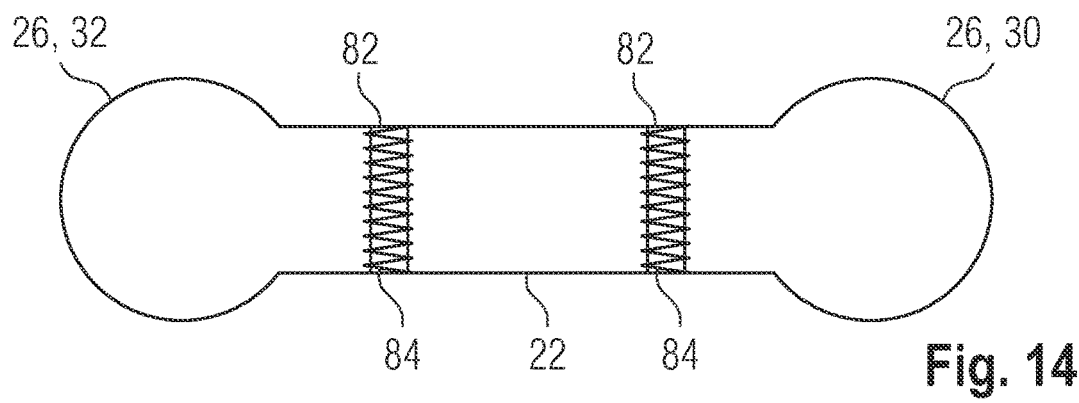
FIGS. 14 to 17 are plan views of four different embodiments of the ferrite foil, which here respectively has an intended flexion position, in which the ferrite foil is locally weakened by one or more indentations, in the regions between one of the two antenna surfaces and the base.
Figure 15:
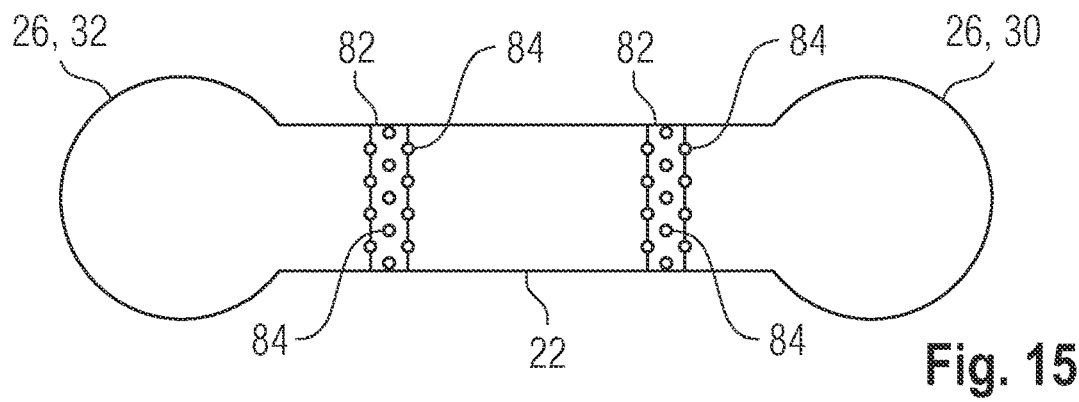
Figure 16:
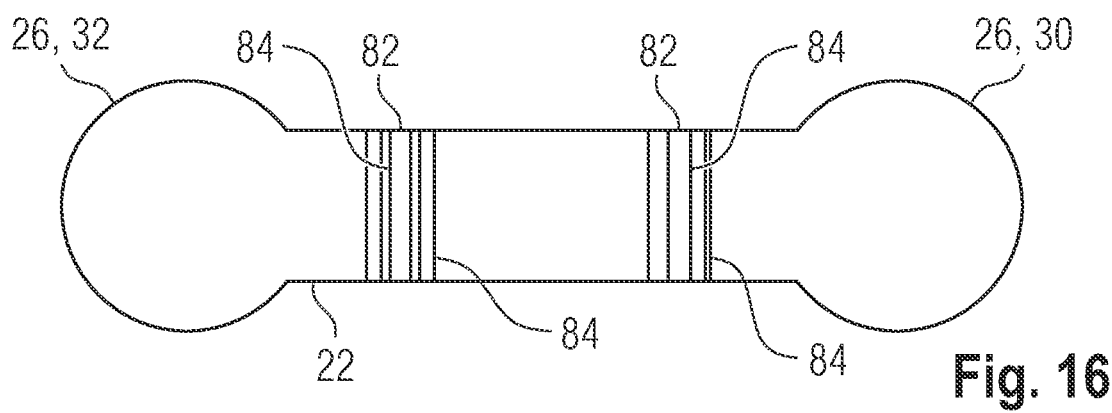
Figure 17:
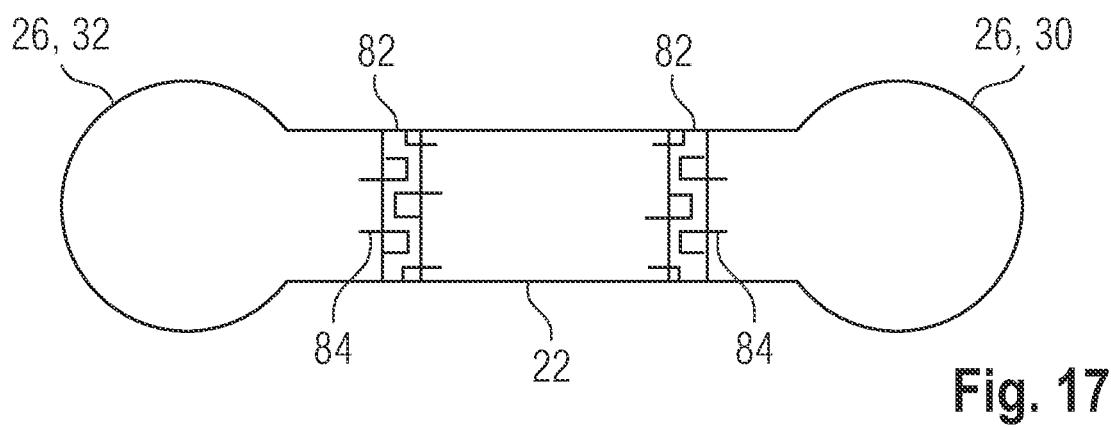

In each of these crease or curvature regions in which the base 34 merges into the angled-off antenna surfaces 30 and 32, according to the exemplary embodiments represented in FIGS. 14 to 17 the ferrite foil 22 is respectively provided with an intended flexion position 82. The intended flexion positions 82 are produced by introducing point-like or linear indentations 84 into the ferrite foil 22 by material removal by means of laser radiation (laser cutting), which locally weaken the ferrite foil 22 but preferably do not penetrate fully through it. FIGS. 14 to 17 show various embodiments of these indentations 84:

a) According to FIG. 14, a serrated linear indentation 84 is provided at each intended flexion position 82.

b) According to FIG. 15, a uniform pattern of point-like indentations 84 is provided at each intended flexion position 82.

c) According to FIG. 16, a plurality of indentations 84 in the form of straight lines, which extend in the transverse direction over the ferrite foil 22, are provided at each intended flexion position 82.

d) According to FIG. 17, a plurality of irregular linear indentations 84, which each approximately have the shape of a letter "U" with two unequally long limbs, are provided at each intended flexion position 82.

Figure 18:
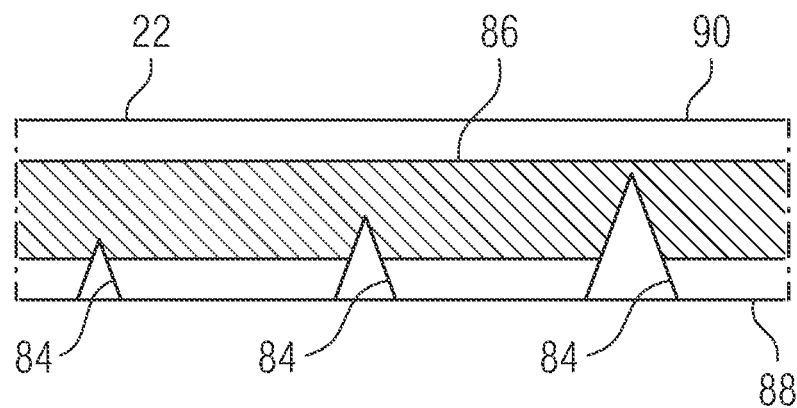
FIG. 18 is a cross-sectional view of the ferrite foil with three differently deep indentations of one of the intended flexion positions.

In FIG. 18, the cross-sectional shape of the indentations 84 is illustrated with the aid of a roughly schematic cross section through the ferrite foil 22. From the representation, it may firstly be seen that the ferrite foil 22 has a central ferrite layer 86, which is flanked while being sandwiched on both sides respectively by a plastic layer 88 and 90 (for example formed from polyethylene terephthalate, PET). With the aid of three indentations 84 indicated in FIG. 18, it is illustrated that the indentations 84 shown in FIGS. 14 to 17 may respectively be configured with a different depth. In a first embodiment variant (in FIG. 18, left), the indentation 84 penetrates substantially only through the plastic layer 88, while the ferrite layer 86 is not touched or is merely scratched. In a second embodiment variant (in FIG. 18, middle), the indentation 84 penetrates deeply into the ferrite layer 22, in particular by about 50% of its layer thickness. In a third embodiment variant (in FIG. 18, right), besides the plastic layer 88, the indentation 84 also penetrates fully or at least almost through the ferrite layer 22, so that only the plastic layer 90 is not touched or is merely scratched. The three above-described embodiments of the indentations 84 cover a continuous configuration range, within which the indentations 84 for the ferrite foils 22 shown in FIGS. 14 to 17 may be varied. Furthermore, a plurality of differently deep indentations 84 or (linear) indentations 84 with a varying depth may also be provided on the same ferrite foil 22.

In the case of the ferrite foils 22 shown in FIGS. 14 to 18, the indentations 84 are introduced on the inner side of the ferrite foil 22 facing toward the battery 10. In the angled-off state of the ferrite foil 22, the indentations 84 therefore lie on the concave side of the crease positions and are fully or at least partially recompressed by the material of the ferrite foil 22 during the flexing of the magnetic foil. Irregular breaks of the ferrite layer 86 are avoided by the intended flexion positions 82.

While the antenna surfaces 30, 32 and the base 34 have always been formed from a one-piece blank of the ferrite foil 22 in the above-described embodiments of the antenna 18, in the examples described below with the aid of FIGS. 19 to 29, the antenna surfaces 30, 32 and the base 34 are respectively composed of two foil blanks 92 and 94 of the ferrite foil 22. Each of the two foil blanks 92, 94 in this case respectively has one of the two antenna surfaces 30, 32 as well as at least one lug 96 protruding (in particular radially) from the edge of the respective antenna surface 30, 32. In order to form the base 34, the or one of optionally a plurality of lugs 96 of one of the two foil blanks 92, 94 is placed overlapping onto a (respectively) corresponding lug 96 of the other foil blank 94 or 92, respectively.

In one embodiment (not represented in more detail) of the antenna 18, a single lug 96 respectively protrudes from each of the antenna surfaces 30, 32. The lugs 96, which are placed above one another, of the two foil blanks 92, 94 in this case form—in a similar way to the exemplary embodiments according to FIGS. 2 to 18—a single-portion continuous variant of the base 34.

Figure 19:
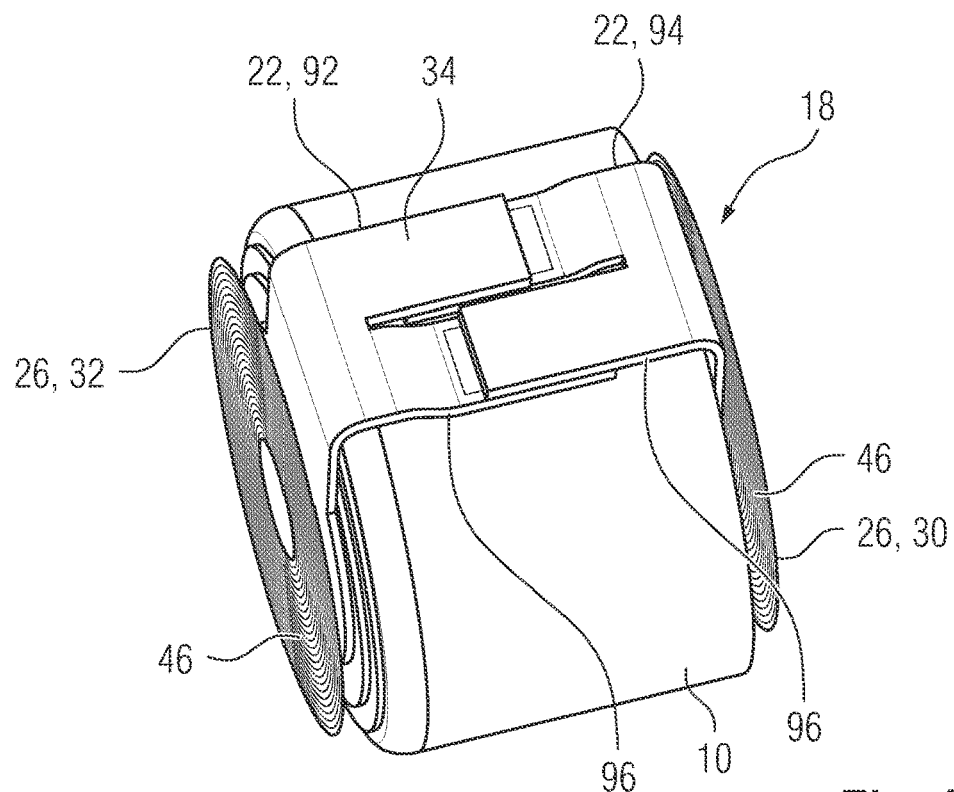
FIGS. 19 and 20 are different perspective views of an embodiment of the antenna, which is composed of two foil blanks of the ferrite foil, the antenna being placed onto the battery.
Figure 20:
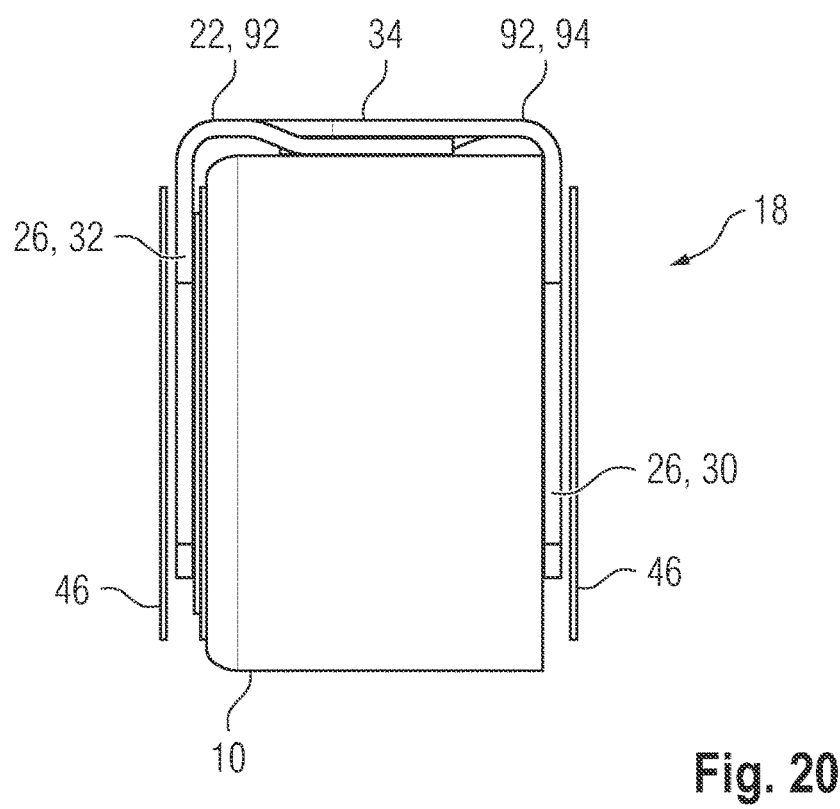
Figure 21:
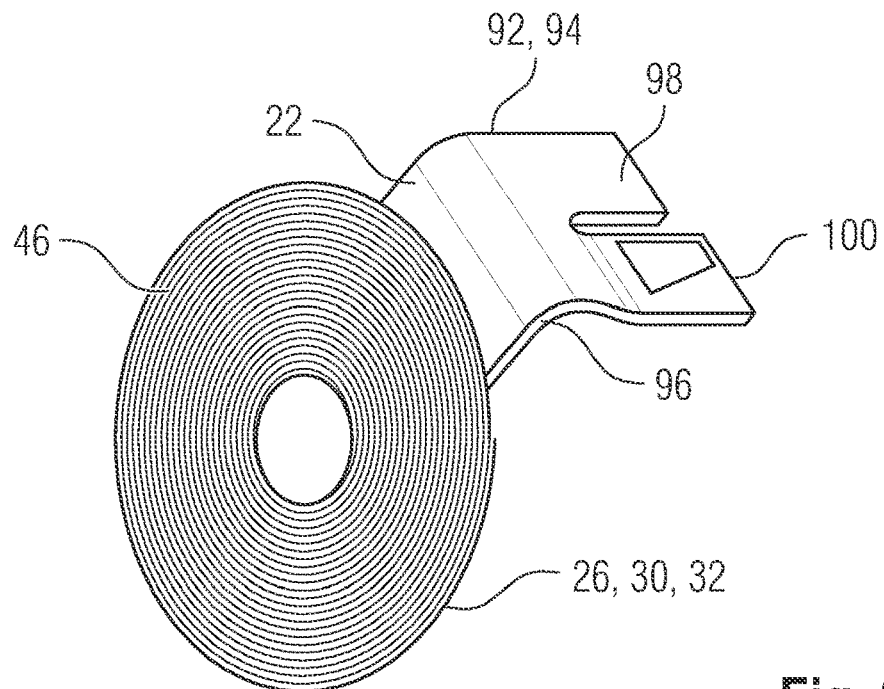
FIG. 21 is a separate perspective view of a foil blank of the antenna according to FIG. 19.

In contrast thereto, in an embodiment of the antenna 18 according to FIGS. 19 to 21, a lug 96 which divides in the region of the base 34 into two branches 98, 100 protrudes from each of the antenna surfaces 30, 32. The branches 98, 100, which are alternately placed above one another, of the lugs 96 of the two foil blanks 92, 94 in this case form a two-portion variant of the base 34. In the representation according to FIGS. 19 and 20, the antenna winding 46—as described above—is fixed indirectly on the antenna surfaces 30 or 32, respectively, by means of the reflection foil 36 (not represented here).

Figure 22:
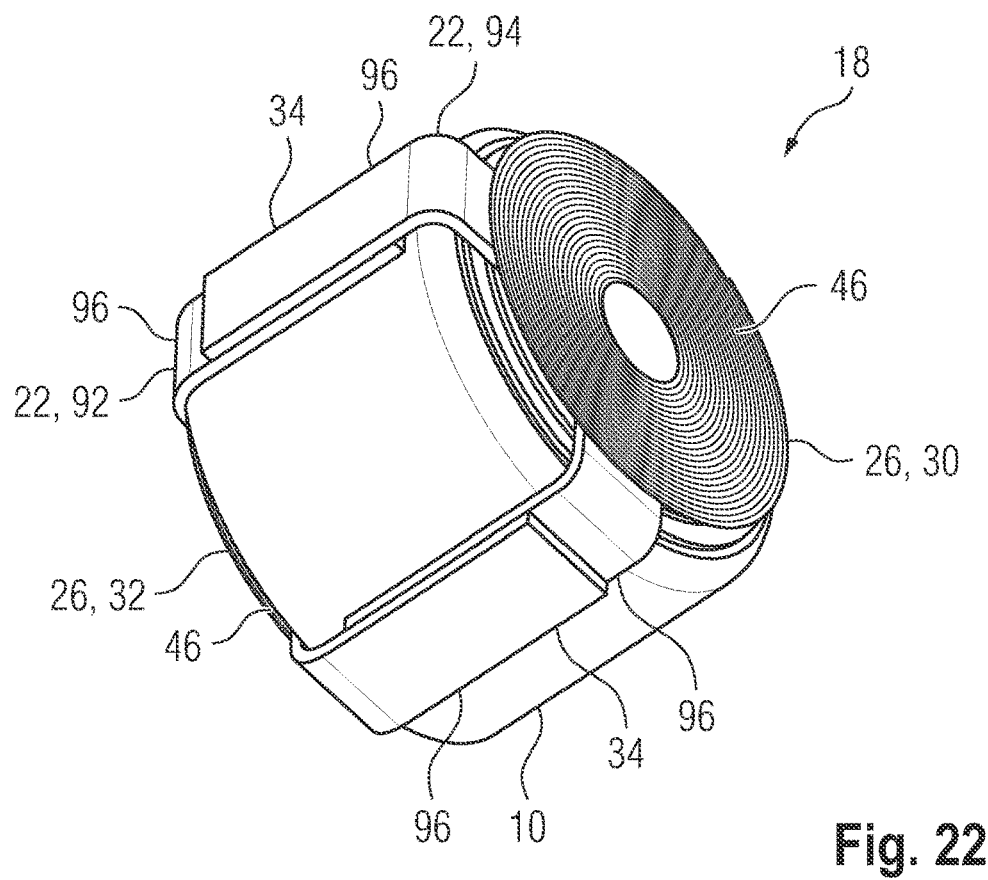
FIG. 22 is a perspective view of a variant of the antenna formed from two foil blanks.
Figure 23:
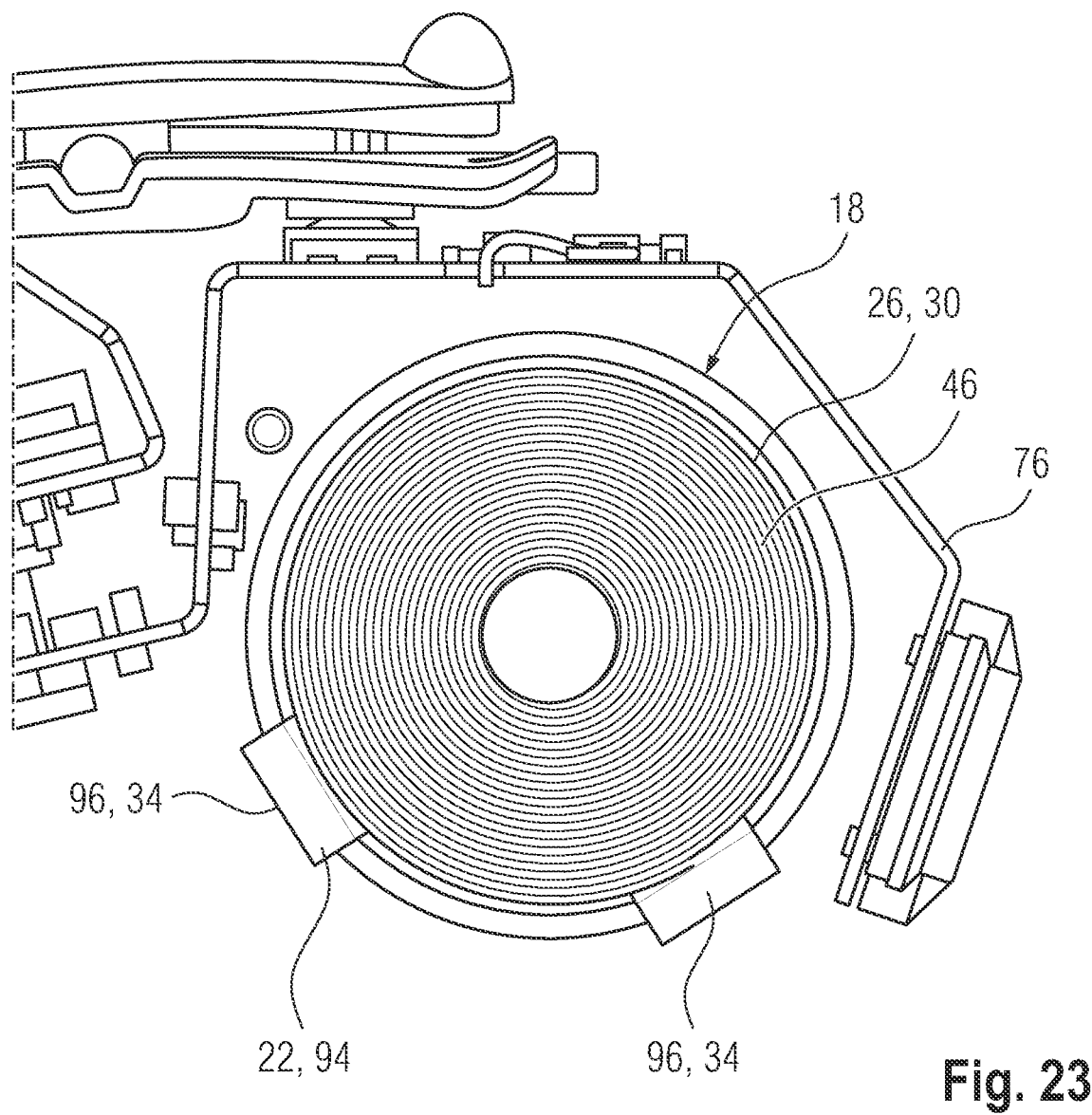
FIG. 23 is a plan view of the variant of the antenna formed from two foil blanks.

In a further exemplary embodiment according to FIGS. 22 and 23, two lugs 96 respectively protrude radially from each of the antenna surfaces 30 and 32, two of these lugs 96 again respectively being placed above one another in an alternating order so as in turn to form a two-portion variant of the base 34. The lugs 96 are in this case arranged distributed over the circumference of the antenna surfaces 30, 32 so that the two portions of the base 34 are separated far apart from one another in relation to their respective width; specifically, the distance between the two portions of the base 34 is in this case for example about three times the width of the individual portion. As seen in a direction looking at the antenna surface 30, the two portions of the base 34 protrude from the antenna surface 30 approximately at an angle of 90° with respect to one another, so that particularly good magnetic coupling is obtained between the antenna surfaces 30, 32.

Furthermore, the two portions of the base 34 in the example according to FIGS. 22 and 23 are arranged on the side of the battery 10 facing away from the circuit board 76. This may—depending on the arrangement of the component parts in the interior of the hearing device 2—be technically advantageous in terms of installation space.

Figure 24:
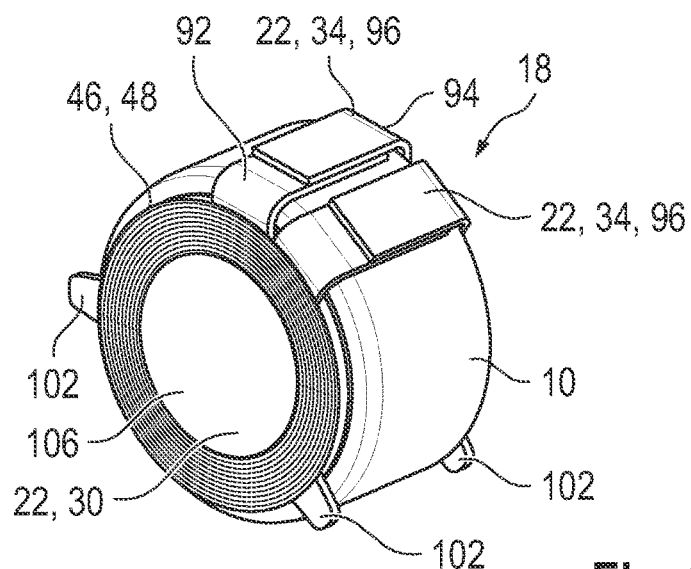
FIG. 24 is a perspective view of a further embodiment of the antenna, in the state placed onto the battery of the hearing instrument.
Figure 25:
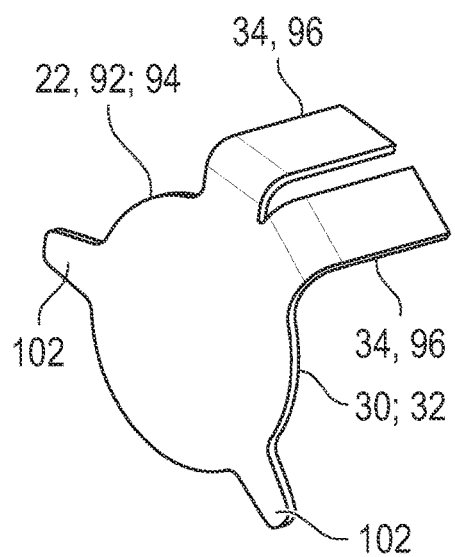
FIG. 25 is a separate perspective view of a foil blank of the antenna according to FIG. 24.
Figure 26:
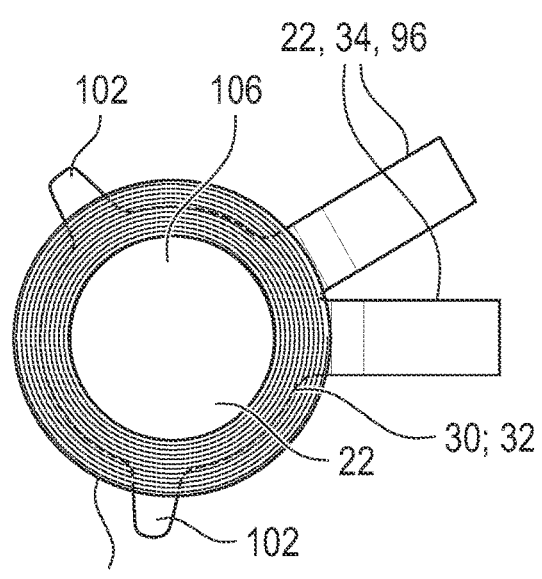
FIG. 26 is a plan view of the foil blank of FIG. 25 in the unfolded state, with a spiral coil of the antenna fixed thereon.

As an alternative, the two portions of the base 34 may also, as shown with the aid of the example according to FIGS. 24 to 26, be arranged close next to one another so that the distance between the two portions is less than or about equal to the width of each portion.

With reference to the example according to FIGS. 24 to 26, it may furthermore be seen that the spiral coil 48 is preferably configured so that its outer diameter is greater than the outer diameter of the assigned antenna surface 30, and therefore so that the spiral coil 48 protrudes laterally beyond the assigned antenna surface 30; the same applies for the further spiral coils 56 and 60, if they are present. In order to stabilize the spiral coil 48, two radial extensions 102 are formed from the edge of the antenna surface 30 here. The second antenna surface 32 is in this case also provided with corresponding radial extensions. The radial extensions 102 are in this case dimensioned so that they protrude in the radial direction beyond the spiral coil 48 (and, if present, the spiral coils 56 and 60).

In this embodiment, the radial extensions 102 are also used for fixing the antenna 18 on an electronics frame (not represented) of the hearing device 2.

Figure 27:
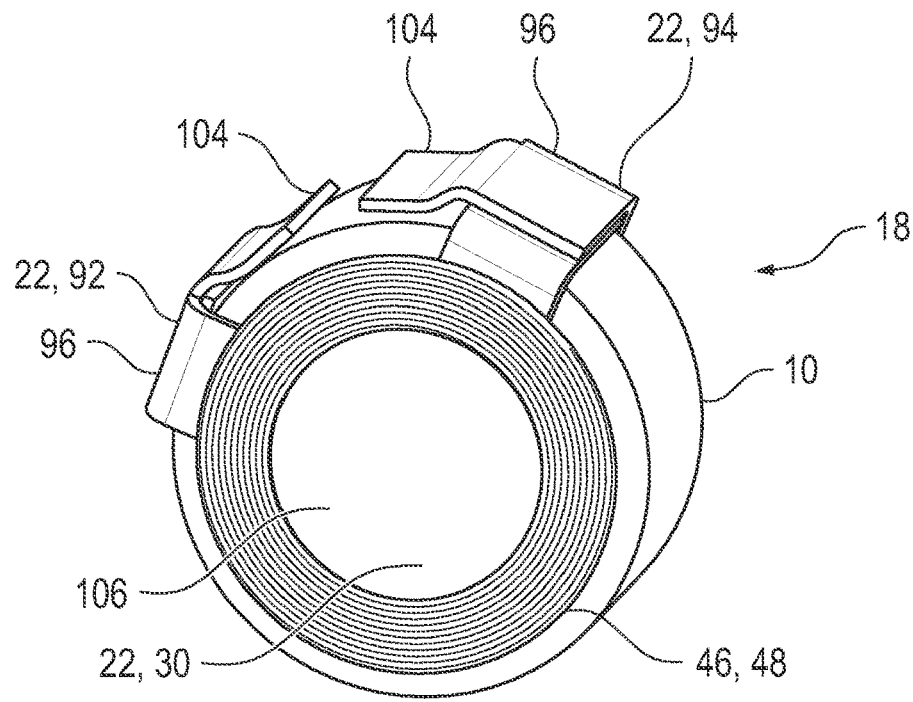
FIG. 27 is a perspective view of a further embodiment of the antenna, in the state placed onto the battery of the hearing instrument.
Figure 28:
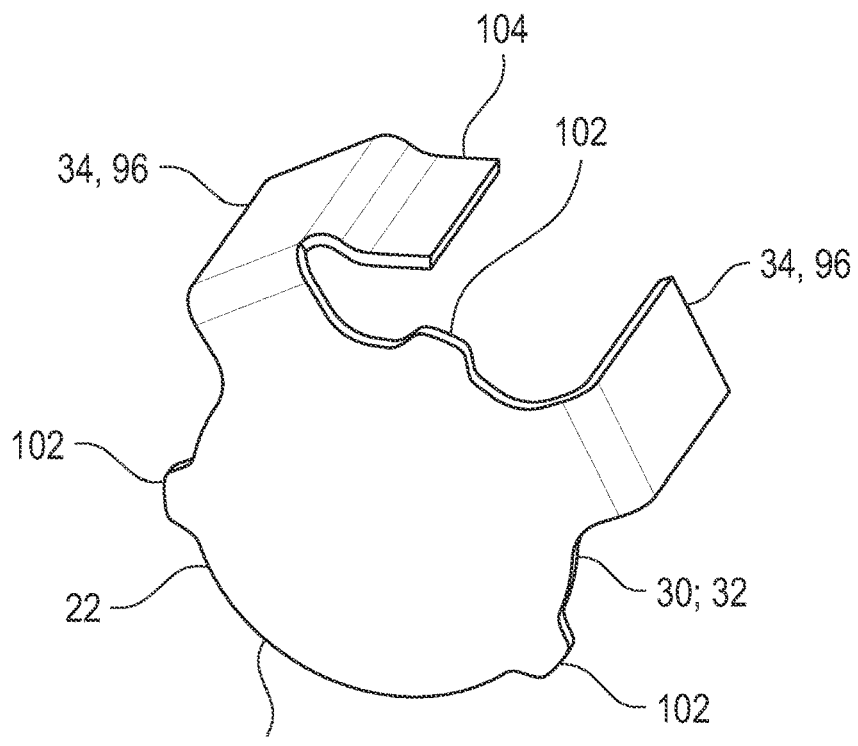
FIG. 28 is a separate perspective representation of a foil blank of the antenna according to FIG. 27.
Figure 29:
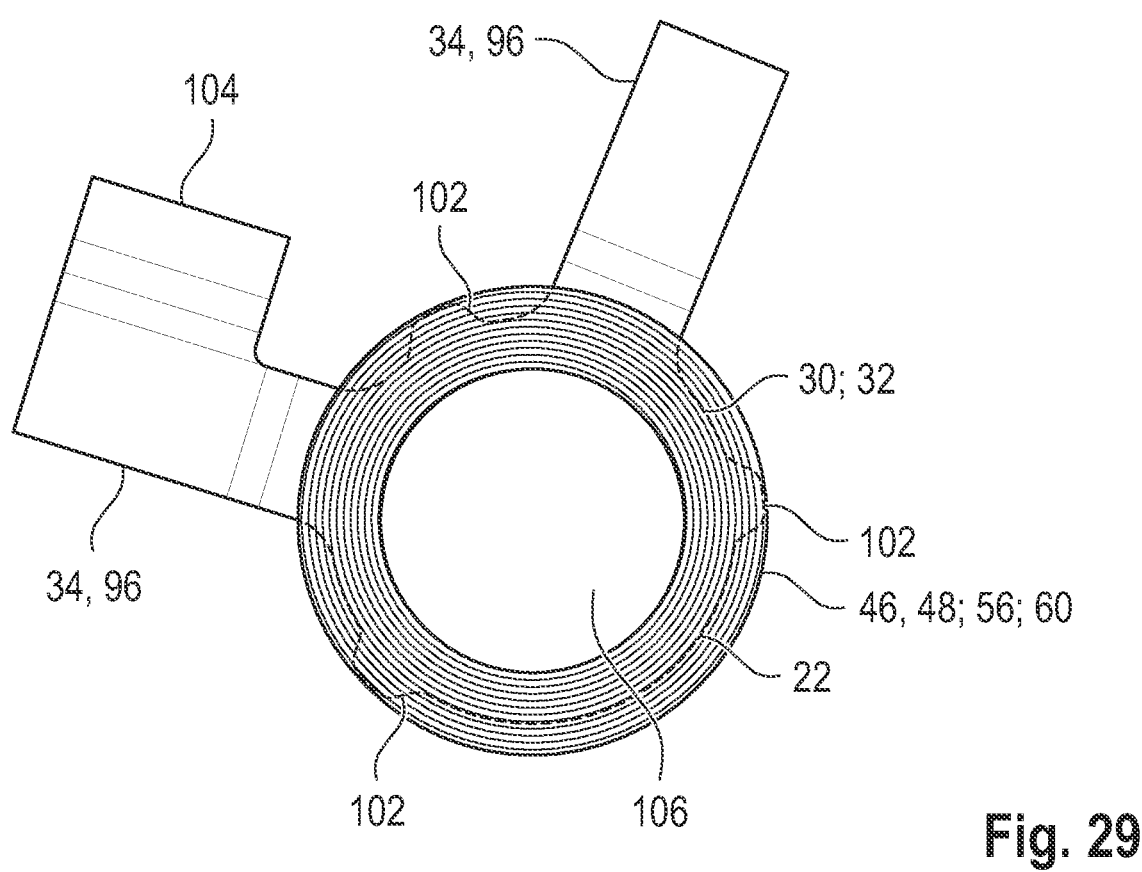
FIG. 29 is a plan view of the foil blank of FIG. 28 in the unfolded state, with a spiral coil of the antenna fixed thereon.

The embodiment of the antenna 18 as shown in FIGS. 27 to 29 differs from the two exemplary embodiments described above particularly in that one of the two lugs 96 of each of the two foil blanks 92, 94 is widened on one side by an additional tab 104. Better purchase of the antenna 18 on the component received in the internal space of the antenna 18, that is to say the battery 10 in the example, is achieved by the two tabs 104.

In the examples according to FIGS. 24 to 29, the spiral coil 48 and—if present—the spiral coils 56 and 60 are respectively formed as air coils. In this case, a plurality of turns of a lacquer-insulated winding wire are wound directly on one another and are baked together by means of the insulating lacquer. The spiral coil 48 is in this case fixed, in particular adhesively bonded, on the antenna surface 30 directly, i.e. without an interposed carrier foil 50 or reflection foil 36; the spiral coils 56, 60 are optionally also fixed in a corresponding way on the antenna surface 32, or the spiral coil 48.

In the examples according to FIGS. 24 to 29, the spiral coil 48 and—if present—the spiral coils 56 and 60 in addition respectively enclose a relatively large free space 106 without turns, the diameter of this free space taking up about 60% of the outer diameter of the respective spiral coil 48, 56, 60.

In the exemplary embodiments of the antenna 18 as shown in FIGS. 19 to 29, the two foil blanks 92 and 94 are preferably manufactured as identical parts. In this way, particularly efficient manufacturing is achieved.

Furthermore, in the exemplary embodiments of the antenna 18 as shown in FIGS. 19 to 29, one of the outer plastic layers of the ferrite foil 22 is preferably respectively removed on mutually opposing surfaces of the lugs 96, so that the lugs 96 bear on one another directly with the ferrite layer 86. In this way, the magnetic coupling between the antenna surfaces 30 and 32 is improved further.

The invention is made particularly clear by the exemplary embodiments described above, but is in no way limited to these exemplary embodiments. Rather, further embodiments of the invention may be derived from the claims and the description above.

The following is a summary list of reference numerals and the corresponding structure used in the above description of the invention:

2 hearing device
4 housing
6 microphones
8 pickup
10 battery
12 signal processor
14 sound channel
16 tip
18 antenna
20 transmission/reception circuit
22 ferrite foil
24 longitudinal end
26 widening
28 connecting section
30 antenna surface
32 antenna surface
34 base
36 reflection foil
38 widening
40 longitudinal end
42 recess
44 slit
46 antenna winding
48 spiral coil
49 coil axis
50 carrier foil
52 winding foil
54 metal housing
56 spiral coil
58 supply lead
60 spiral coil 62 reflection foil
64 guide body
66 inner side
68 guide surface
70 protrusion
72 protrusion
74 supply lead
76 circuit board
78 guide pin
80 hole
81 guide radius
82 intended flexion position
84 indentation
86 ferrite layer
88 plastic layer
90 plastic layer
92 foil blank
94 foil blank
96 lug
98 branch
100 branch
102 radial extension
104 tab
106 free space
I (input) audio signal
O output audio signal
U supply voltage

The invention claimed is:

1. A magneto-inductive antenna for a hearing instrument, comprising:
two antenna surfaces, including a first antenna surface and a second antenna surface, being respectively formed from a flexible magnetic foil;
a base formed from a magnetic material or contains a magnetic layer and connecting said two antenna surfaces to one another, said two antenna surfaces being angled off from said base in a same direction; and
an antenna winding having at least one first monolayer spiral coil disposed externally on said first antenna surface so that an axis of said at least one first monolayer spiral coil is oriented perpendicularly with respect to said first antenna surface.

2. The antenna according to claim 1, further comprising a second monolayer spiral coil disposed externally on said second antenna surface so that an axis of said second monolayer spiral coil is oriented perpendicularly with respect to said second antenna surface.

3. The antenna according to claim 2, further comprising at least one third monolayer spiral coil which is disposed externally and parallel to said at least one first monolayer spiral coil on said first antenna surface.

4. The antenna according to claim 3, wherein said at least one first monolayer spiral coil and said second monolayer spiral coil or said third monolayer spiral coil can be driven independently of one another.

5. The antenna according to claim 2, wherein at least one of said first and second monolayer spiral coils is produced using radio frequency identification (RFID) technology.

6. The antenna according to claim 2, wherein at least one of said first and second monolayer spiral coils is formed by a conductor track of a flexible circuit board.

7. The antenna according to claim 2, wherein at least one of said first and second monolayer spiral coils is formed as an air coil having a plurality of directly adjacent turns of an insulated winding wire, wherein said directly adjacent turns are fixed to one another by a lacquer layer.

8. The antenna according to claim 7, wherein said insulated winding wire is a lacquer-insulated winding wire.

9. The antenna according to claim 1, wherein said antenna surfaces and said base are formed by a one-piece foil blank of said flexible magnetic foil.

10. The antenna according to claim 1, wherein said two antenna surfaces and said base are formed by two foil blanks of said flexible magnetic foil which respectively protrude into a region of said base.

11. The antenna according to claim 1, wherein said two antenna surfaces are each widened relative to said base.

12. The antenna according to claim 1, further comprising a first magnetic reflection layer formed of an electrically conductive material having a low magnetic permeability which is respectively disposed externally on said first antenna surface and said second antenna surface, so that said first magnetic reflection layer is disposed between said at least one first monolayer spiral coil and a respectively assigned one of said two antenna surfaces, wherein said first reflection layer respectively has two recesses formed therein with one of said recesses being in a region of each of said two antenna surfaces, and wherein said at least one first monolayer spiral coil is disposed in a region of one of said two recesses.

13. The antenna according to claim 12, wherein said first magnetic reflection layer protrudes laterally beyond said two antenna surfaces.

14. The antenna according to claim 12, wherein said first magnetic reflection layer also covers said base.

15. The antenna according to claim 12, wherein said first magnetic reflection layer has on a side respectively facing away from said base, in a region of each of said two antenna surfaces, a slit formed therein which extends from a respective one of said recesses as far as an outer edge of said first reflection layer.

16. The antenna according to claim 12, further comprising a second magnetic reflection layer formed of an electrically conductive material having a low magnetic permeability, wherein said second magnetic reflection layer is respectively disposed internally on said first antenna surface and said second antenna surface.

17. The antenna according to claim 1, wherein at least one of said first and second monolayer spiral coils is produced using radio frequency identification (RFID) technology by printing, electrolytic deposition, vapor deposition, sputtering, etching or embedding a coil wire on a carrier foil.

18. The antenna according to claim 1, wherein said two antenna surfaces are each widened relative to said base and have a circular widening.

19. A hearing instrument, comprising:
said antenna according to claim 1.

20. The hearing instrument according to claim 19, further comprising a functional component having a housing formed from an electrically conductive material having a low magnetic permeability, wherein said antenna is placed onto said functional component so that said housing internally flanks said two antenna surfaces.

* * * * *